United States Patent
Beredimas et al.

(10) Patent No.: US 11,924,081 B2
(45) Date of Patent: Mar. 5, 2024

(54) OPTIMIZING SELECTION OF ZERO TRUST NETWORK ACCESS CLOUD EDGE NODES FOR INTERNAL APPLICATION DELIVERY

(71) Applicant: Citrix Systems, Inc., Fort Lauderdale, FL (US)

(72) Inventors: Ioannis Beredimas, Salonika (GR); Panagiotis Gourgaris, Patras (GR); Panteleimon Evangelos Aivaliotis, Patras (GR); Aristotelis Mertis, Patras (GR)

( * ) Notice: Subject to any disclaimer, the term of this patent is extended or adjusted under 35 U.S.C. 154(b) by 0 days.

(21) Appl. No.: 17/872,791

(22) Filed: Jul. 25, 2022

(65) Prior Publication Data

US 2023/0421471 A1 Dec. 28, 2023

Related U.S. Application Data

(63) Continuation of application No. PCT/GR2022/000032, filed on Jun. 28, 2022.

(51) Int. Cl.
*H04L 43/0864* (2022.01)
*H04L 61/4511* (2022.01)

(52) U.S. Cl.
CPC ...... *H04L 43/0864* (2013.01); *H04L 61/4511* (2022.05)

(58) Field of Classification Search
None
See application file for complete search history.

(56) References Cited

U.S. PATENT DOCUMENTS

| 7,720,997 | B1 * | 5/2010 | Gourlay | H04L 12/5692 709/245 |
|---|---|---|---|---|
| 2002/0087722 | A1 * | 7/2002 | Datta | H04L 61/30 709/239 |
| 2003/0208641 | A1 * | 11/2003 | Wesemann | H04L 9/40 719/332 |
| 2009/0182884 | A1 * | 7/2009 | Datta | H04L 61/30 709/228 |
| 2010/0153558 | A1 * | 6/2010 | Kommula | H04L 61/4511 718/105 |
| 2012/0041970 | A1 * | 2/2012 | Ghosh | H04L 67/568 707/769 |

(Continued)

OTHER PUBLICATIONS

International Search Report and Written Opinion on PCT Appl. No. PCT/GR2022/000032 dated Feb. 21, 2023 (11 pages).

*Primary Examiner* — Joshua Joo

(57) ABSTRACT

The present solution provides systems and methods for a GSLB service to access a first plurality of measurements of network latency between a plurality of access-points and the first client device and a second plurality of measurements of network latency between the plurality of access-points and one or more of data centers. The GSLB service can receive, from the one or more data centers, health of an application deployed across the one or more data centers. The GSLB service can determine, according to the first plurality of measurements, the second plurality of measurements and the health of the application, a first data center of the one or more data centers and a first access-point of the plurality of access-points. The GSLB service can send, to the first client device, a domain name system (DNS) response identifying the first access-point and the first data center.

20 Claims, 15 Drawing Sheets

(56) References Cited

U.S. PATENT DOCUMENTS

| | | | |
|---|---|---|---|
| 2013/0019020 A1* | 1/2013 | Kang | H04M 1/72445 709/227 |
| 2016/0094423 A1* | 3/2016 | Parthasarathy | H04L 67/56 709/224 |
| 2016/0094602 A1* | 3/2016 | Fuh | H04L 65/765 709/219 |
| 2018/0167298 A1 | 6/2018 | He et al. | |
| 2018/0367498 A1* | 12/2018 | Bliss | H04L 45/74 |
| 2019/0179736 A1* | 6/2019 | Sharma | G06F 11/321 |
| 2019/0386904 A1 | 12/2019 | Srivatsan et al. | |
| 2021/0075761 A1* | 3/2021 | Li | H04L 61/103 |
| 2021/0099386 A1* | 4/2021 | Goel | H04L 67/10 |
| 2021/0099532 A1* | 4/2021 | Goel | H04L 67/1001 |
| 2021/0359972 A1* | 11/2021 | Gal | H04L 61/4511 |
| 2022/0158941 A1* | 5/2022 | Fedorov | H04L 43/0864 |
| 2022/0200887 A1* | 6/2022 | Menon | H04L 67/51 |
| 2022/0311709 A1* | 9/2022 | Jeuk | H04L 41/5032 |
| 2022/0400161 A1* | 12/2022 | Zafiris | H04L 67/1025 |
| 2023/0109515 A1* | 4/2023 | Isaacson | G06Q 20/12 705/26.62 |
| 2023/0119230 A1* | 4/2023 | Sinha | H04L 43/0852 370/389 |

\* cited by examiner

OPTIMIZING SELECTION OF ZERO TRUST NETWORK ACCESS CLOUD EDGE NODES FOR INTERNAL APPLICATION DELIVERY

CROSS-REFERENCE TO RELATED APPLICATION

This application is a continuation of and claims priority to International Application No. PCT/GR2022/000032, titled "OPTIMIZING SELECTION OF ZERO TRUST NETWORK ACCESS CLOUD EDGE NODES FOR INTERNAL APPLICATION DELIVERY," and filed on Jun. 28, 2022, the contents of which are hereby incorporated herein by reference in its entirety for all purposes.

FIELD OF THE DISCLOSURE

The present application generally relates to computing systems and environments, including but not limited to systems and methods for managing network traffic.

BACKGROUND

Network communications are increasingly relying on cloud-based technologies. As users access online resources that can be provided by various remote servers and network devices, the network traffic can increasingly be handled using various cloud-based products or services. Sometimes user interaction with particular services or resources on the network may involve accessing cloud products or services that are located over great distances from the user, potentially affecting various aspects of network traffic delivery.

SUMMARY

This summary is provided to introduce a selection of concepts in a simplified form that are further described below in the Detailed Description. This Summary is not intended to identify key features or essential features, nor is it intended to limit the scope of the claims included herewith.

In some aspects, the present solution can relate to a method, such as a method for optimization of zero trust network access (ZTNA) cloud edge nodes for internal application delivery. The method can include a service, such as a global server load balancing service, accessing a first plurality of measurements of network latency between a plurality of access-points, such as points of presence (POPs) and the first client device. The service can access a second plurality of measurements of network latency between the plurality of access-points and one or more of data centers. The service can receive, from the one or more data centers of a plurality of data centers, health of an application deployed across the one or more data centers. The service can determine, according to the first plurality of measurements, the second plurality of measurements and the health of the application, a first data center of the one or more data centers and a first access-point of the plurality of access-points. The service can send, to the first client device, a domain name system (DNS) response identifying the first access-point and the first data center.

The method can include the service receiving a DNS request from the first client device for the application. The method can include the service receiving the first plurality of measurements from an agent of the first client and the second plurality of measurements from the one or more of data centers. The method can include the service storing, in a database the first plurality of measurements and the second plurality of measurements. The method can include the service determining the first data center by eliminating or downgrading the at least one or more data centers, where health of the application is degraded relative to health of the application deployed at the first data center.

The second plurality of measurements can include network latencies between the plurality of access-points and one or more of connector devices of the one or more of data centers. The method can include the service determining that the first access-point and the first data center corresponds to a least combined network latency among those corresponding to pairs of an access-point and a data center from the one or more data centers and the one or more of data centers. The first measurement of the first plurality of measurements can include a round-trip time of a packet communicated between the first client device and a first access-point of the plurality of access-points. The second measurement of the second plurality of measurements can include a round-trip time of a packet communicated between one of the plurality of access-points and one or more of data centers. The DNS response can include metadata or a DNS extension to indicate the first data center.

In some aspects, the present solution can relate to a network node. The network node can include at least one processor configured to implement multiple acts. The at least one processor can access a first plurality of measurements of network latency between a plurality of access-points and the first client device and a second plurality of measurements of network latency between the plurality of access-points and the one or more of data centers. The at least one processor can receive, from the one or more data centers of a plurality of data centers, health of an application deployed across the one or more data centers. The at least one processor can determine, according to the first plurality of measurements, the second plurality of measurements and the health of the application, a first data center of the one or more data centers and a first access-point of the plurality of access-points. The at least one processor can send, to the first client device, a domain name system (DNS) response identifying the first access-point and the first data center.

The network node can include the at least one processor that is configured to receive a DNS request from the first client device for the application. The at least one processor can be configured to receive the first plurality of measurements from an agent of the first client, and the second plurality of measurements from one or more data centers. The at least one processor can be configured to store, in a database, the first plurality of measurements and the second plurality of measurements. The at least one processor can be configured to determine the first data center by eliminating or downgrading at least one of the one or more data centers where health of the application is degraded relative to health of the application deployed at the first data center.

The second plurality of measurements can include network latencies between the plurality of access-points and one or more connector devices of the one or more data centers. The at least one processor ca configured to determine that the first access-point and the first data center corresponds to a least combined network latency among those corresponding to pairs of an access-point from the plurality of access points and a data center from the one or more data centers. A first measurement of the first plurality of measurements can include a round-trip time of a packet communicated between the first client device and a first access-point of the plurality of access-points. A second measurement of the second plurality of measurements can include a round-trip time of a packet communicated between one of the plurality of access-points and one or more data centers. The DNS response can include metadata or a DNS extension to indicate the first data center.

In some aspects, the present disclosure can relate to a non-transitory computer-readable medium storing instructions that, when executed by at least one processor of a service, can cause the at least one processor to perform one or more acts. The at least one processor can access a first plurality of measurements of network latency between a plurality of access-points and the first client device and a second plurality of measurements of network latency between the plurality of access-points and one or more data centers. The at least one processor can receive, from the one or more data centers of a plurality of data centers, health of an application deployed across the one or more data centers. The at least one processor can determine, according to the first plurality of measurements, the second plurality of measurements and the health of the application, a first data center of the one or more data centers and a first access-point of the plurality of access-points. The at least one processor can send, to the first client device, a domain name system (DNS) response identifying the first access-point and the first data center. The at least one processor can determine the first data center by eliminating or downgrading at least one of the one or more data centers where health of the application is degraded relative to health of the application deployed at the first data center

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 3:
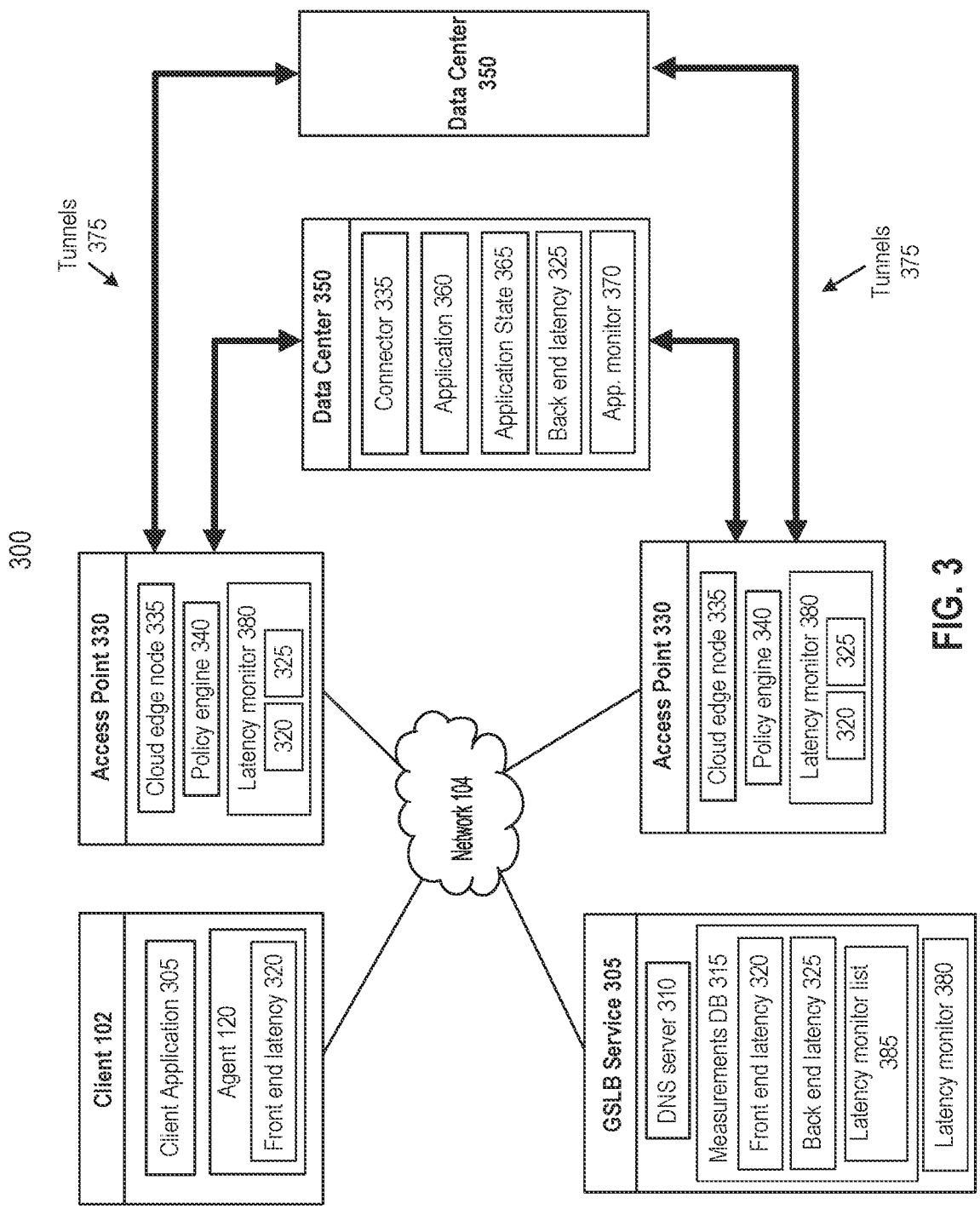
Figure 4:
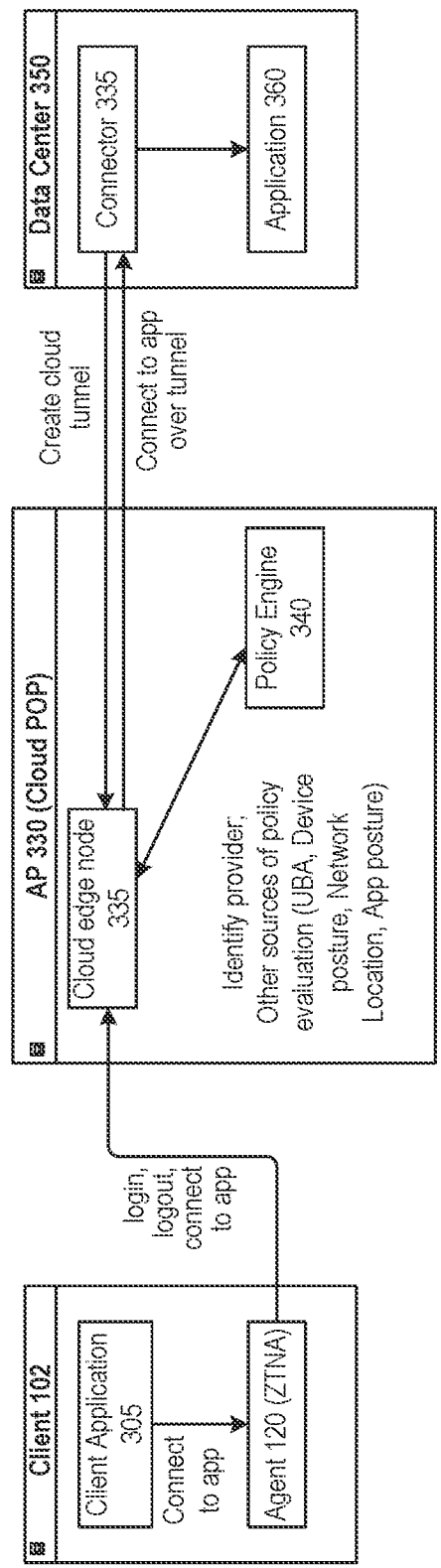
Figure 5:
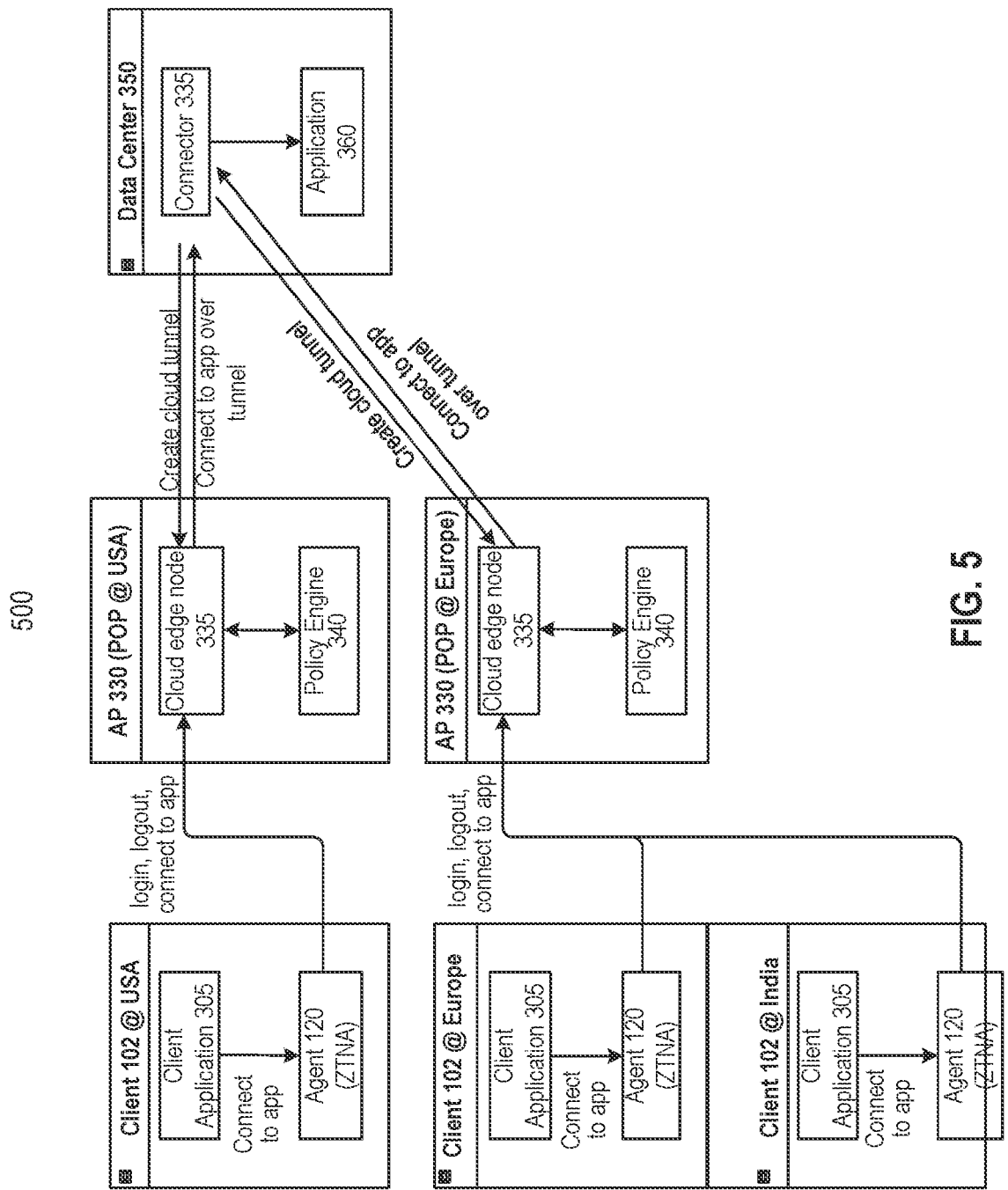
Figure 6:
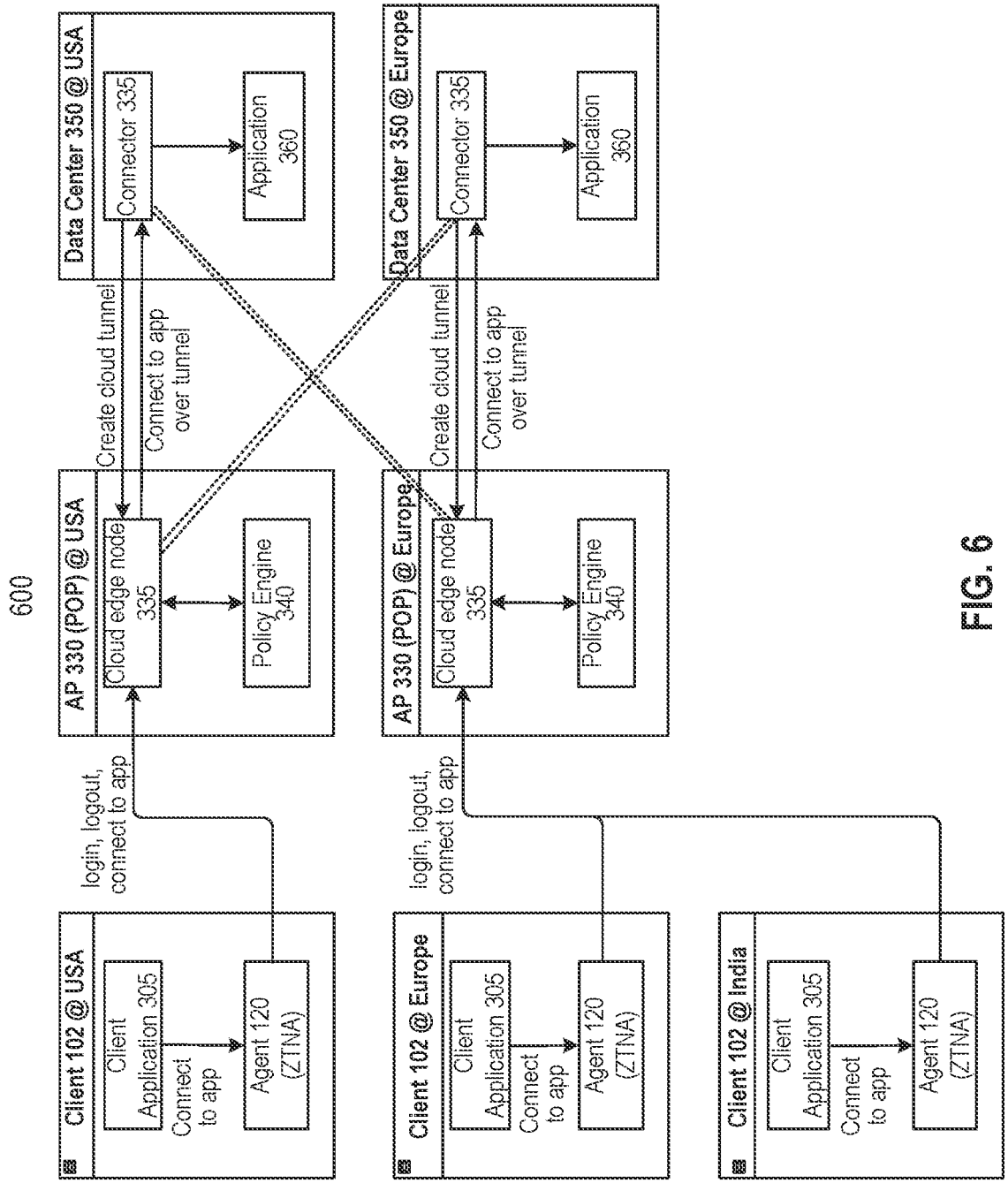
Figure 7:
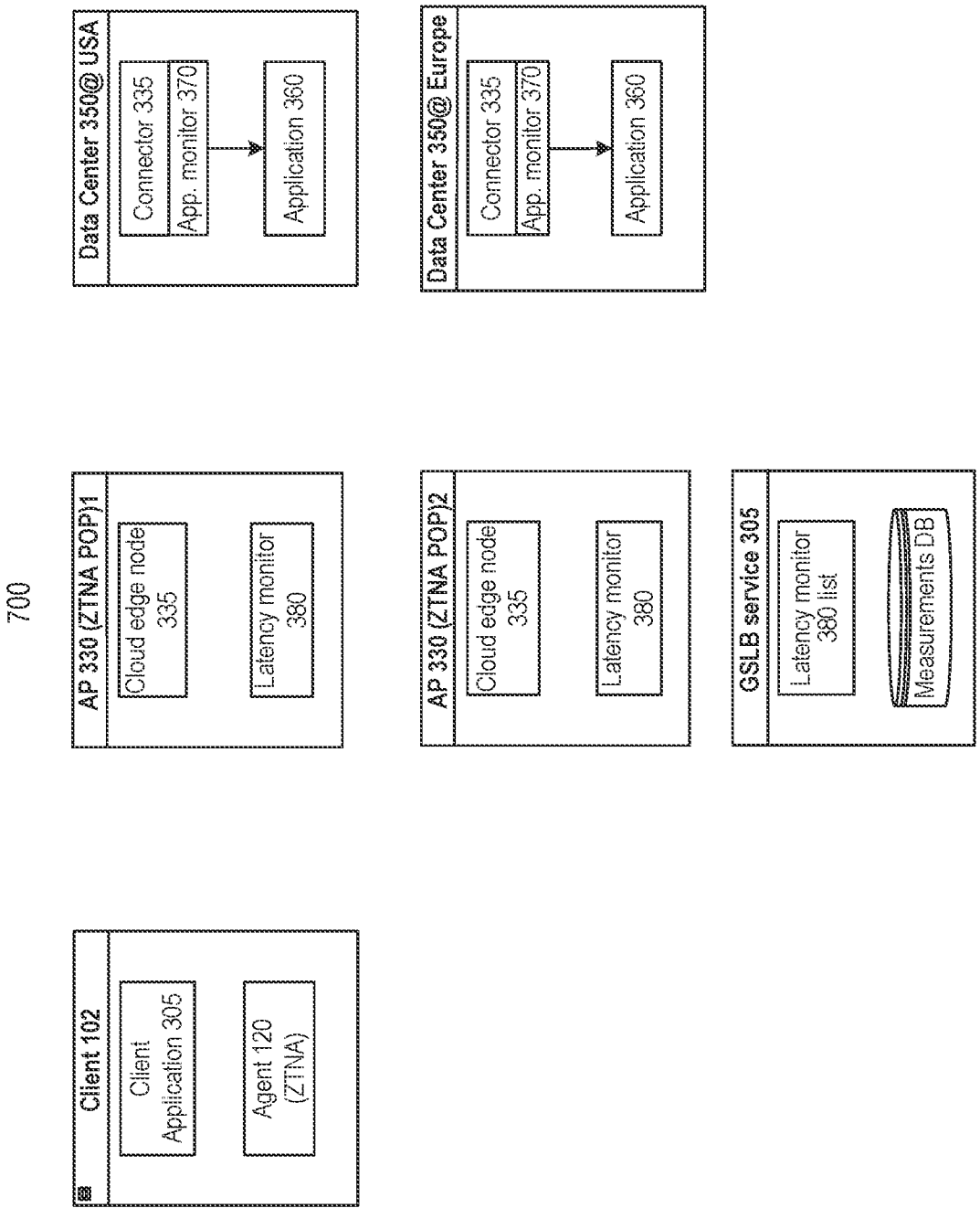
Figure 8:
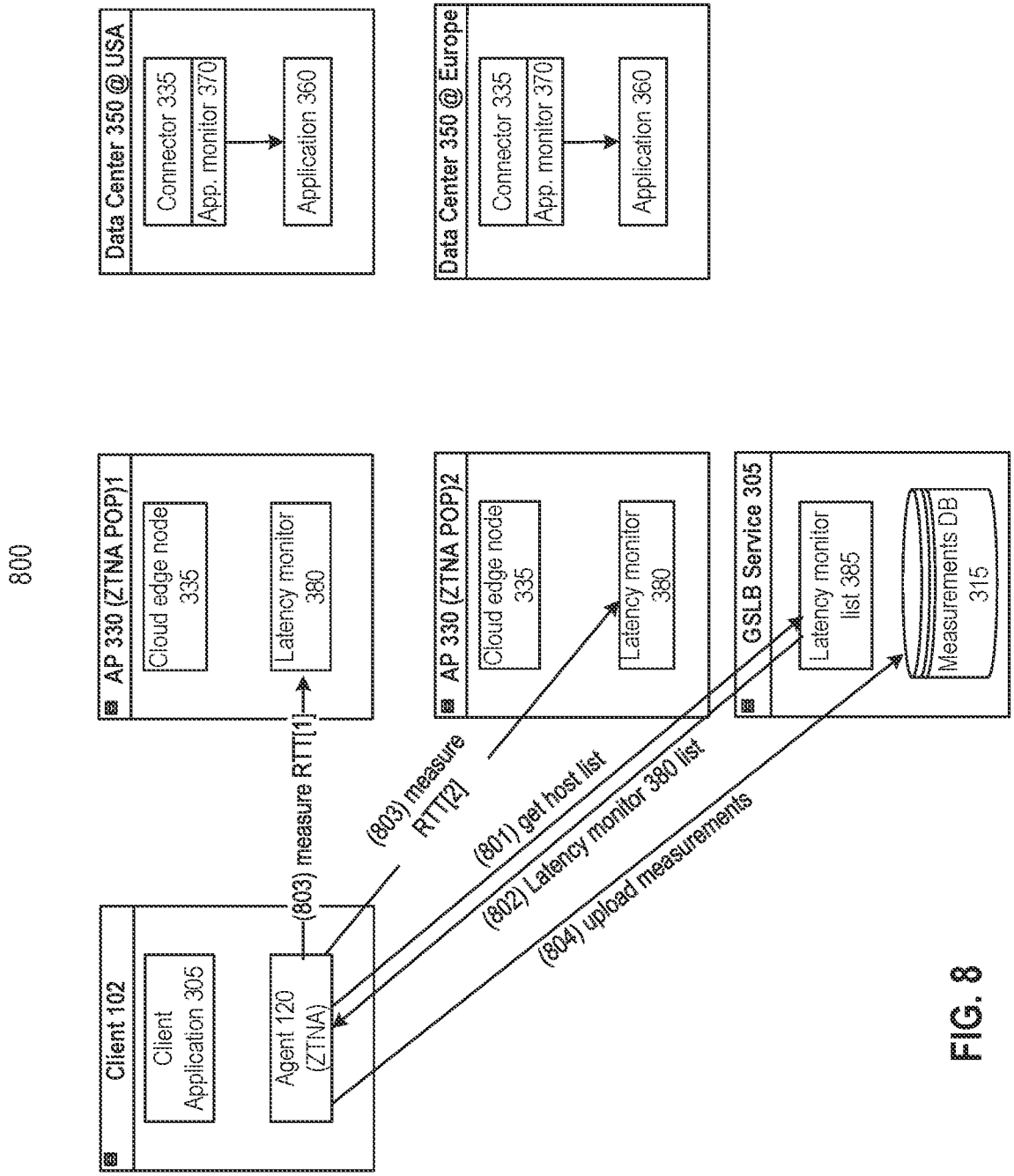
Figure 9:
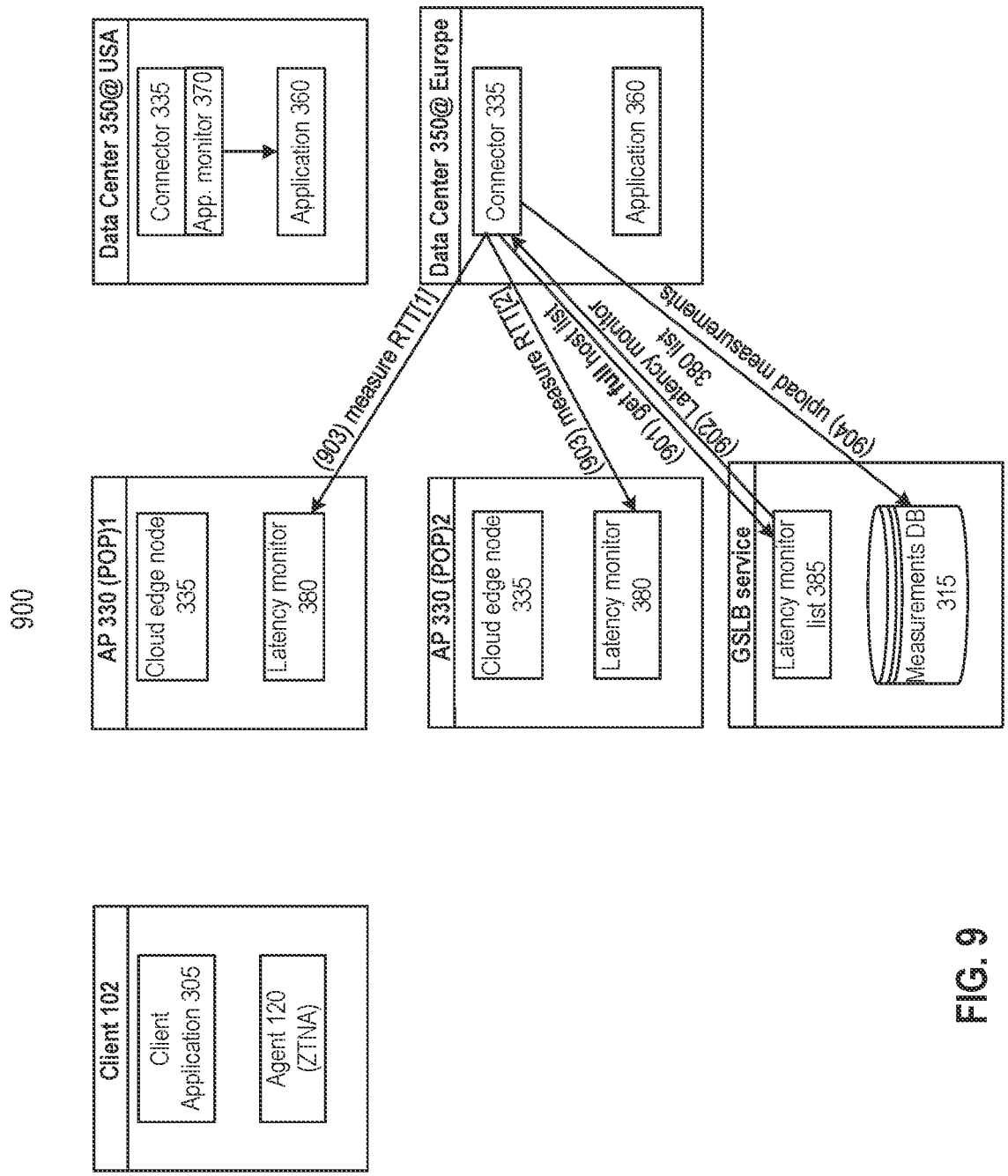
Figure 10:
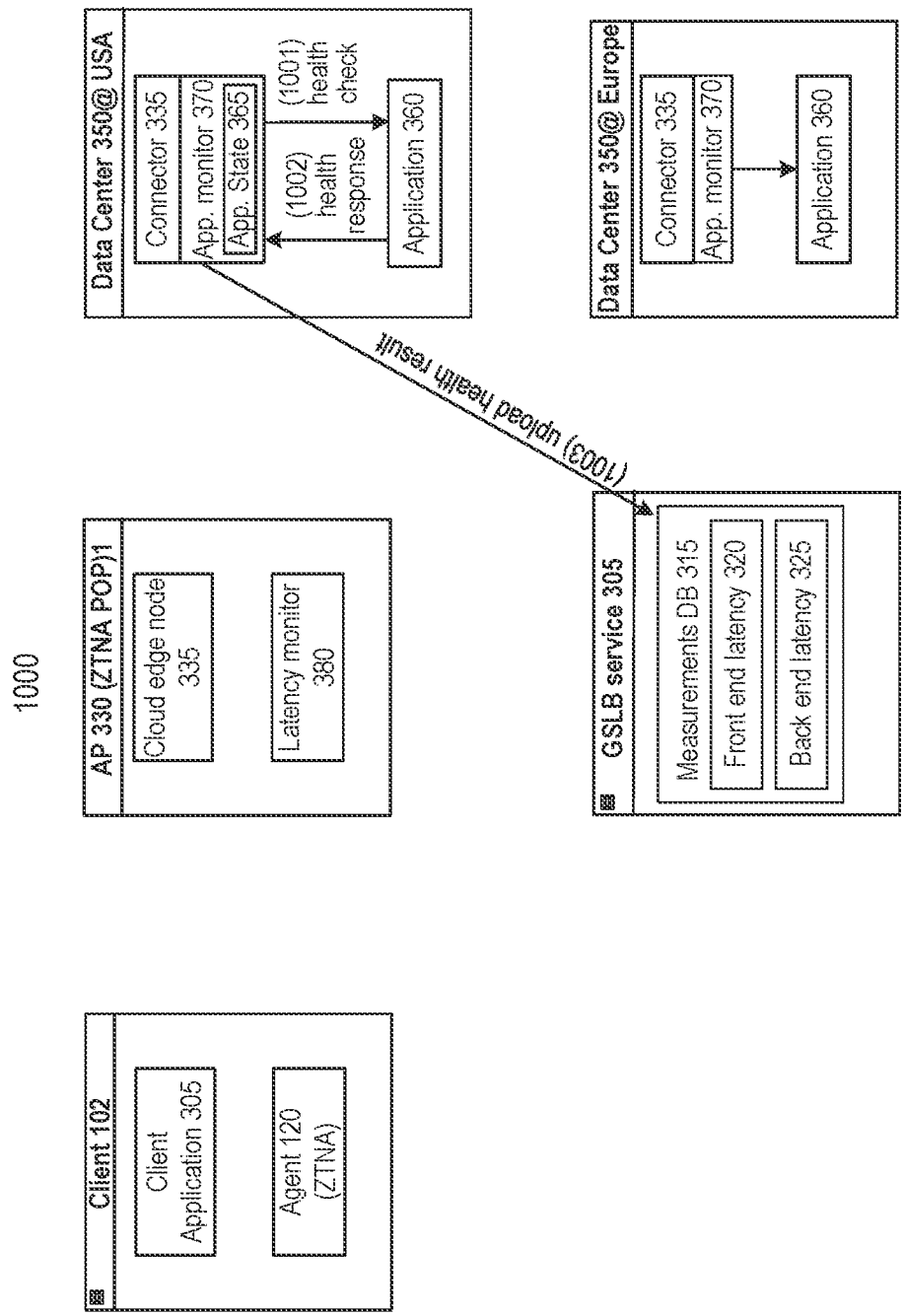
Figure 11:
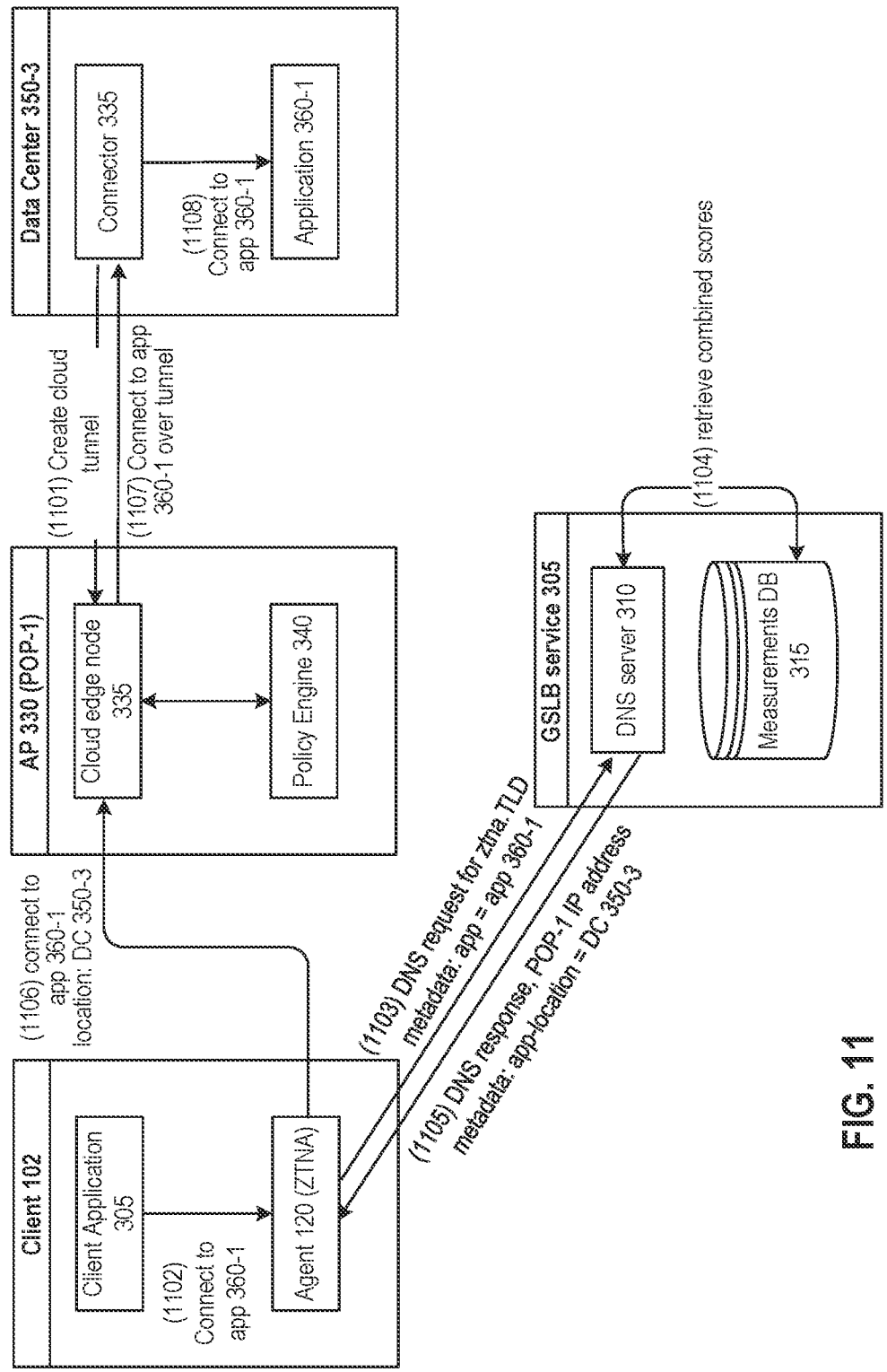
Figure 12:
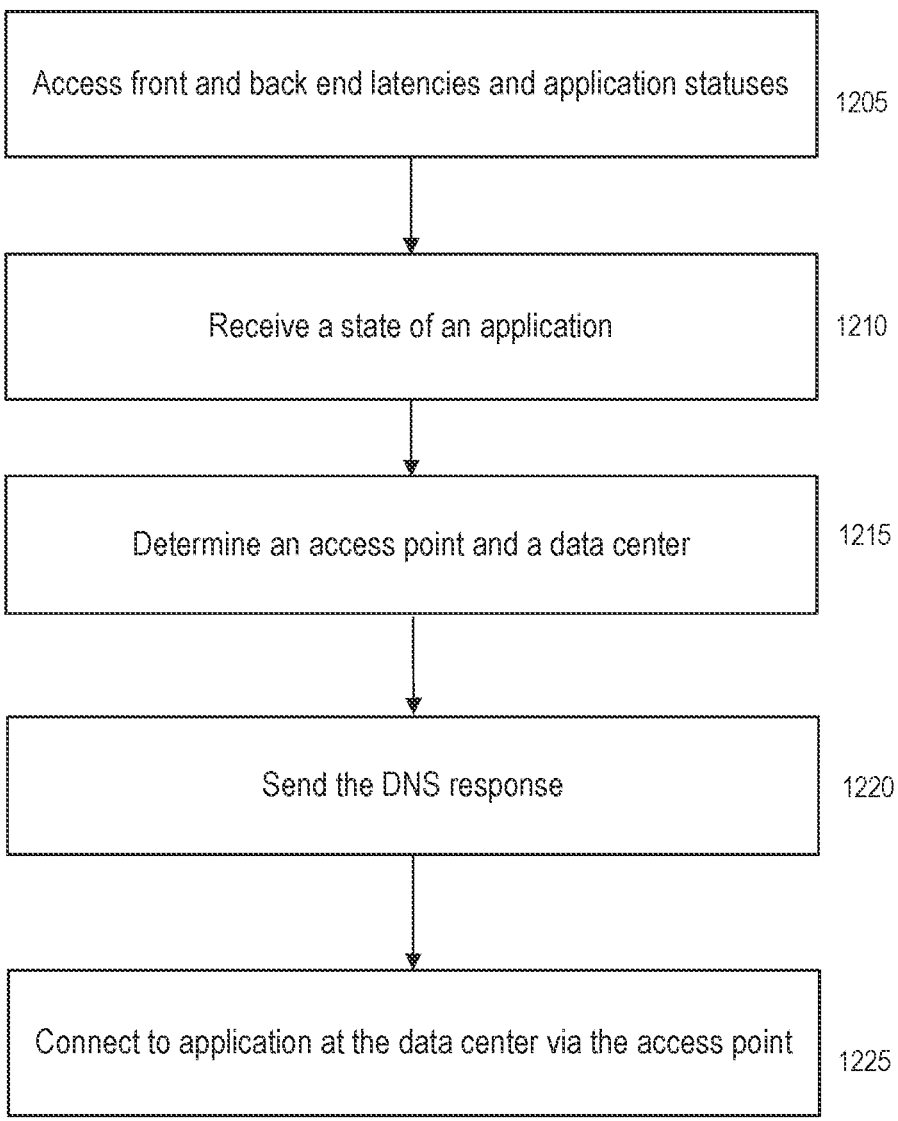

FIG. 3 includes a block diagram of an example system for selecting an access point for optimized internal application delivery, in accordance with an illustrative embodiment;

FIG. 4 includes a flow diagram of an example system and method providing secure remote access to applications and services based on defined access control policies, in accordance with an illustrative embodiment;

FIG. 5 includes a flow diagram of an example system and method that provides secure remote access to applications and services, in accordance with an illustrative embodiment;

FIG. 6 includes a flow diagram of an example system and method that provides secure remote access to applications and services with multiple access points and multiple data centers, in accordance with an illustrative embodiment;

FIG. 7 includes a block diagram of an example system for selecting an access point for optimized internal application delivery from multiple access points and multiple data centers, in accordance with an illustrative embodiment;

FIG. 8 includes a flow diagram of an example process for collecting front end latencies between one or more clients and one or more access points, in accordance with an illustrative embodiment;

FIG. 9 includes a flow diagram of an example process for collecting back end latencies between one or more data centers and one or more access points, in accordance with an illustrative embodiment;

FIG. 10 includes a flow diagram of an example process for collecting application state information (e.g., heath of an application) at a data center, in accordance with an illustrative embodiment;

FIG. 11 includes a flow diagram of an example process for selecting a combination (e.g., a pair) of an access point and a data center based on front and back end latencies and application states (e.g., health) to connect the client with a target application, in accordance with an illustrative embodiment; and FIG. 12 is a flow diagram of an example process for implementing selection of access points and data centers to minimize/reduce overall connection latency between the client and the target application, in accordance with an illustrative embodiment.

DETAILED DESCRIPTION

Users can access network resources through on-premises virtual private network (VPN) which can be implemented in a subnetwork of an exposed, outward-facing services of an organization deployed at a customer perimeter or a data center. A data center can, for example include network devices providing applications to the users, which can access such applications via access points, such as points of presence (POPs) communicating with the back-end data centers via secured tunnels. When a user on a client attempts to access an internal application provided by one of the data centers, via one of the access points, the user may experience varying amounts of delays or latencies potentially adversely affecting the user experience.

The delays or latencies can be caused by multiple factors. For example, a user can be geographically located far from the access point through which the user is attempting to reach a data center, or the user can be far from the data center itself. In addition, the access point may be located far from the data center, and thus also add to the latency. In addition, the health status of the application provided by the destination data center may be affected or deteriorated, potentially causing additional latencies, while other applications can have their status (e.g., health) at a high level, thus potentially making an application located at a further data center a better option to the user than the application with a poorer health deployed at a closer data center. In addition, some access points may have front end latencies between the users and the access points that are worse than others, making such access points less attractive. Moreover, the latencies between users and the access points can be dynamic and can change frequently, depending on the state, health and load of intermediary network computing systems. All of these factors can in combination create a set of circumstances for the user which make selecting the optimal path of connection (e.g., the path with least combined latency) very difficult, adversely affecting the user experience.

The present solution addresses these and other issues by providing systems and methods which route the user's network traffic to the most optimal access point out of a plurality of access points and to a most optimal data center, out of one or more data centers, resulting in a connection that has a smallest latency out of all combinations of access points, data centers and internal target applications available. The systems and methods of the present solution can over time, continuously or periodically gather front end latencies between the users and access points as well as back end latencies between the access points and the data centers, along with the states of health of applications deployed at the data centers. The systems and methods of the present solution can then utilize the gathered front and back end latencies and the application state data (e.g., application health statuses) to determine the most suitable pair of the access point and the data center on which the target internal application is provided. The most suitable pair of the access point and the data center will then provide the connection for the client that has the smallest combined latency, thereby maximizing the network performance and improving the user experience.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for selecting ZTNA cloud edge nodes for internal application delivery A. Network and Computing Environment Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Figure 1A:
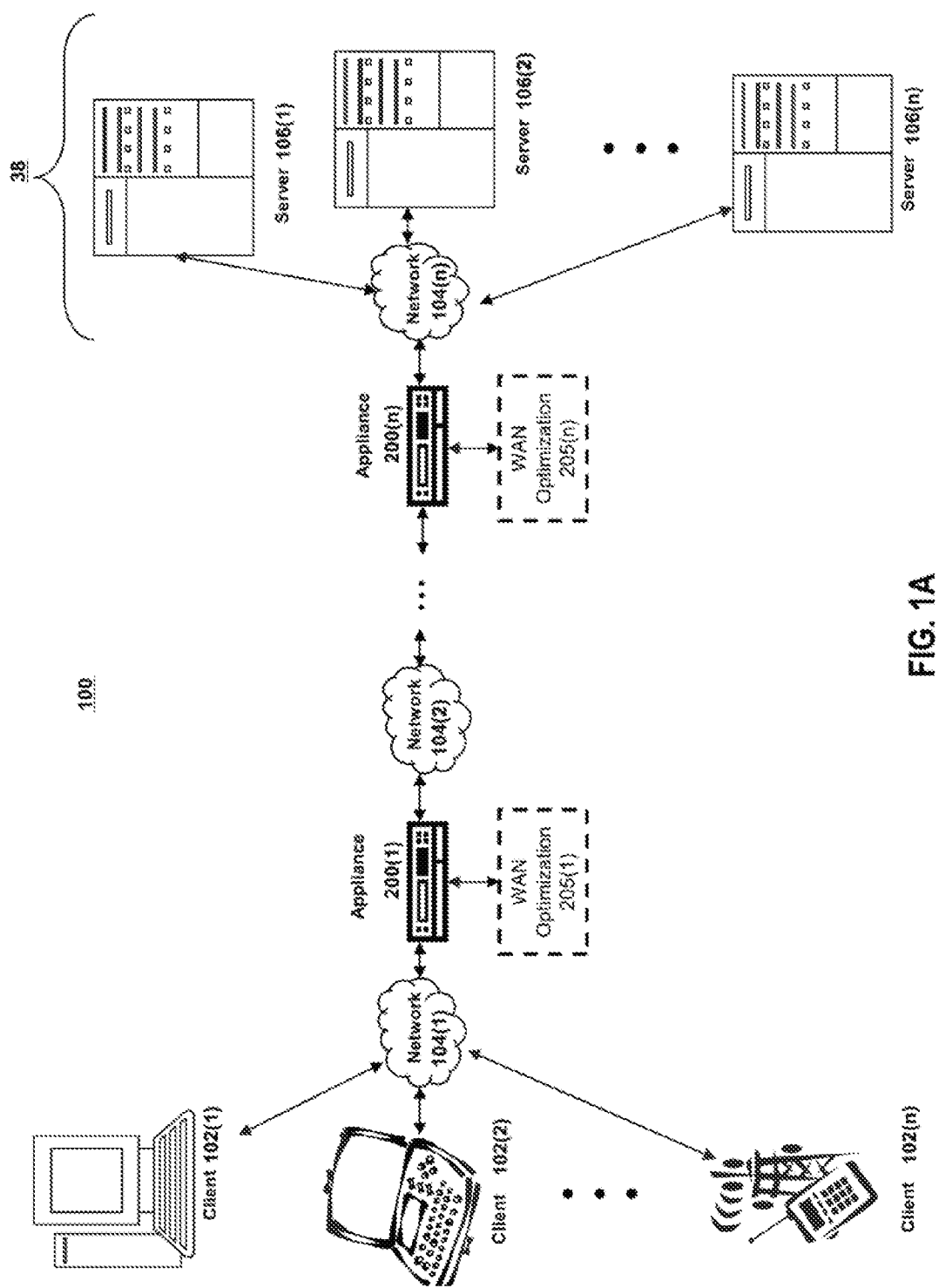
FIG. 1A is a block diagram of a network computing system, in accordance with an illustrative embodiment.

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
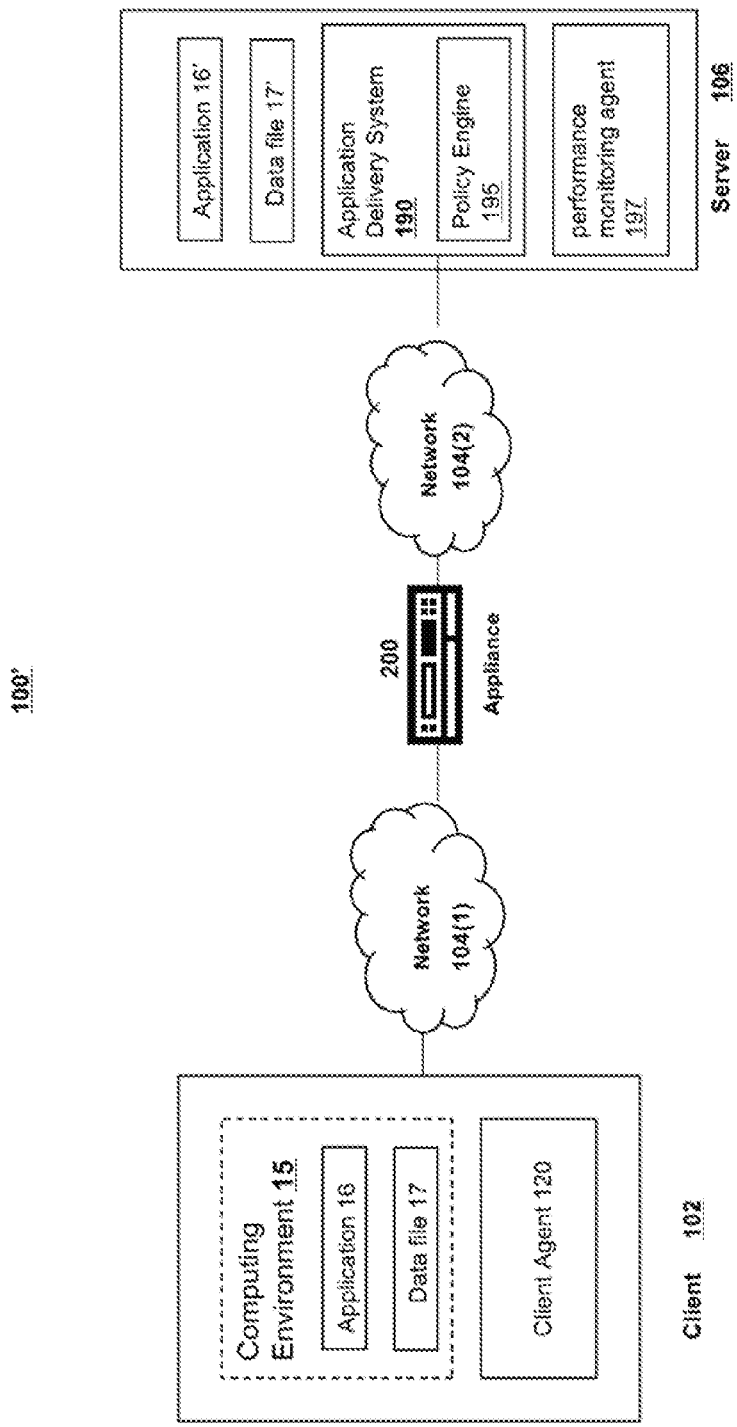
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
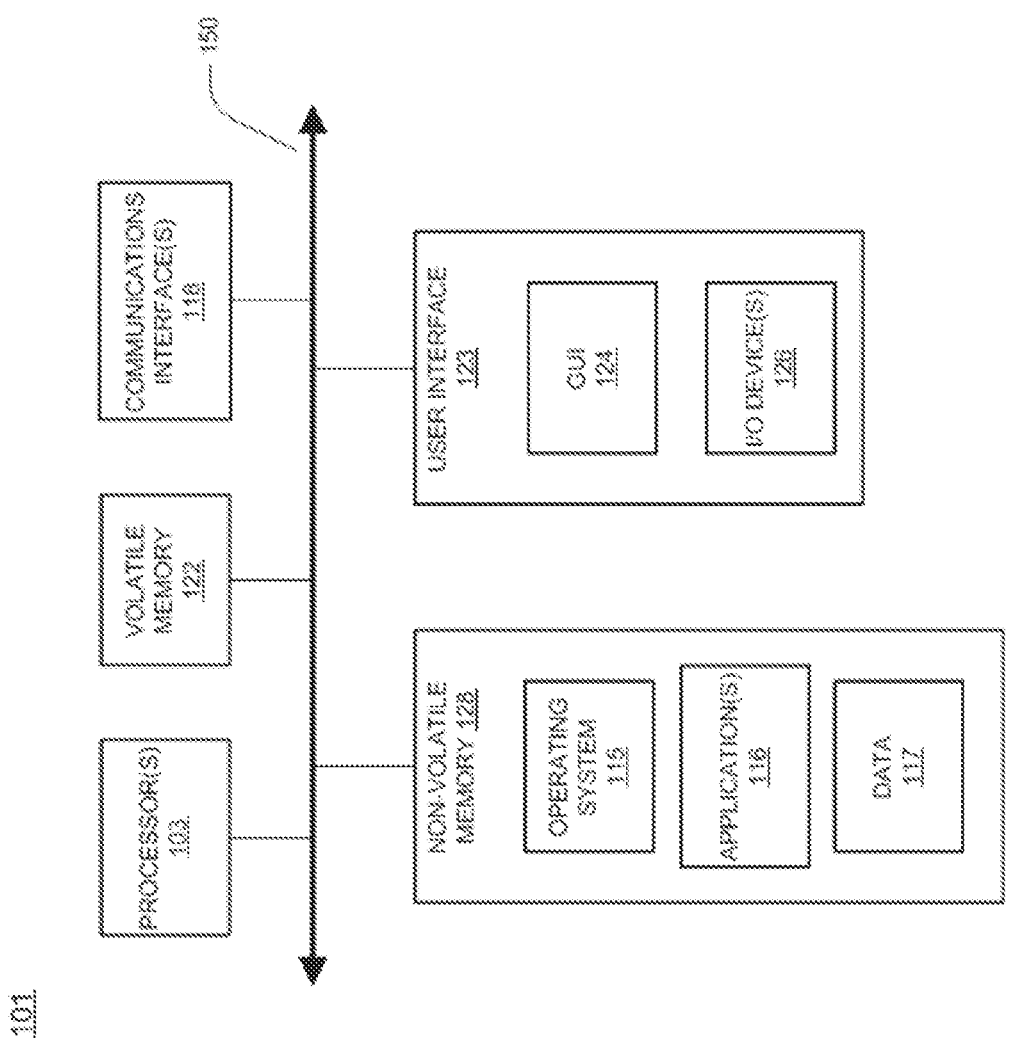
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s)

126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
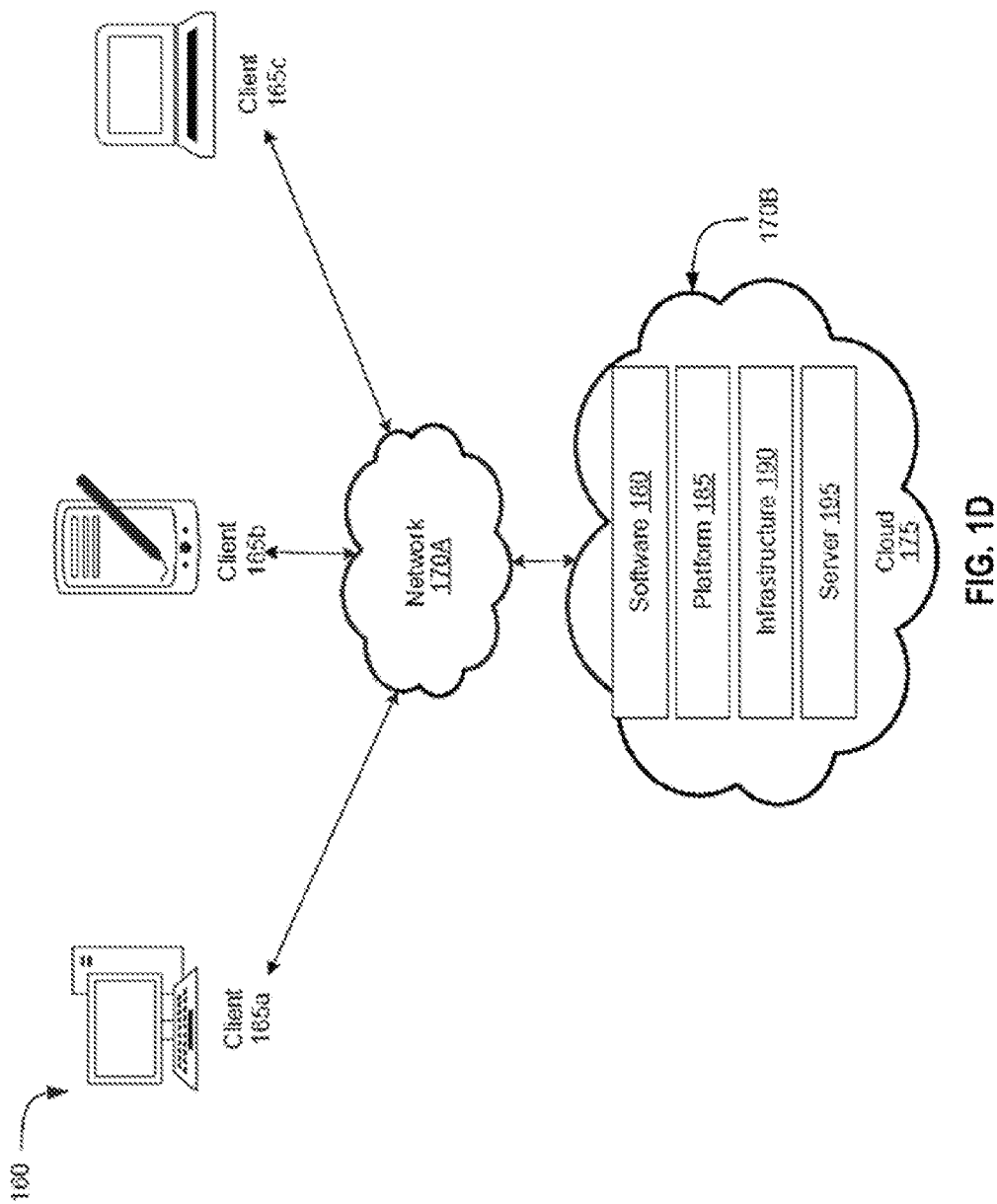
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 can include any functionality or features of clients 102 and vice versa. Clients 165 may include, e.g., thick clients, thin clients, and zero clients. The cloud 175 may include back end platforms, e.g., servers 195, storage, and server farms or data centers. Clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
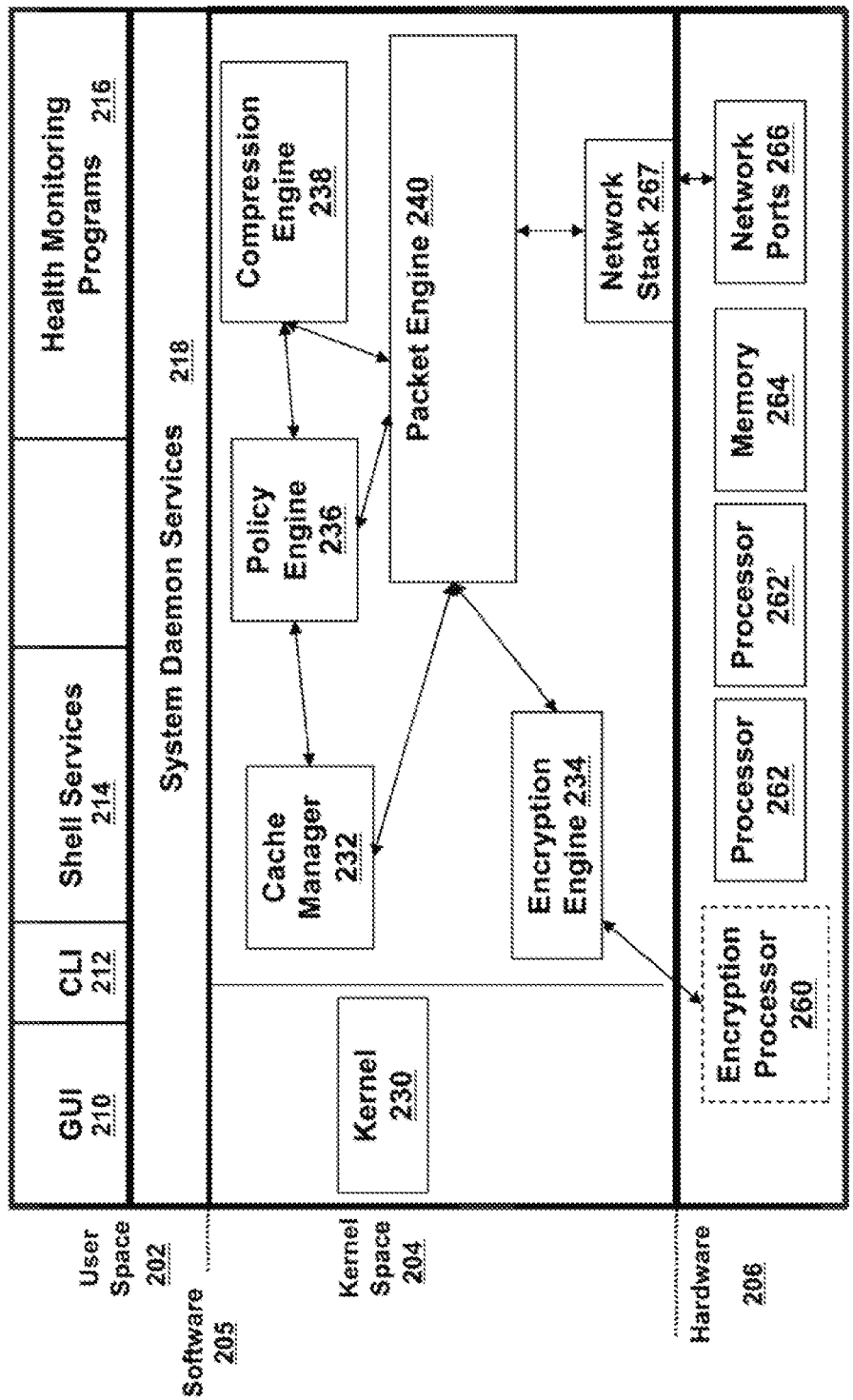
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Selecting Cloud Edge Nodes for Application Delivery

A Zero Trust Network Access (ZTNA) can include a set of technologies and techniques that can provide users on client devices with secure remote access to applications and services based on defined access control policies. Unlike VPNs which can grant complete access to networks by default, ZTNA solutions can default to deny access to all clients, except for those clients whose users have been explicitly granted access. In some respects, a ZTNA system can act as a cloud-based trust access broker, evaluating an access request from a client to an (internal) application on a data center and an on-premises connector appliance of the data center to provide VPN-less access to such internal applications, such as via dedicated tunnels between the access points to which the client connects and the data centers providing the application. The application may be referred to as an internal application because the application is internal to, or provided within an enterprise network or intranet for instance.

When a user requests access to an application provided (e.g., hosted or served) by a data center, the user may be granted access to the data center via an access point. Depending on the geographical location of the user, the access point and the data center, the range of delays which the user can experience accessing the target internal application provided by various possible data centers, via various possible access points, can vary widely. For instance, latencies or delays can vary between about one or more tens of milliseconds to multiple hundreds of milliseconds as they can be caused by many factors, including for example: the distance between the user and the access point, the distance between the access point and the data center, the health of the application at the data center, the resources consumed or available at the various possible access points and/or data centers, the front end latencies between the possible access point and a client device, and the back-end latencies between the possible access points and the possible data centers. When an application sought by the client is provided by a plurality of data centers, via a plurality of access points, latencies experienced by the client can be very different depending on which access point and which data center handles the requested connection.

The present solution comprises systems and methods for selecting the ZTNA access points (and their cloud edge nodes) which can result in minimized/reduced delays and latencies experienced by the user. The present solution can utilize measurements of front-end latencies between a client and one or more access points, measurements of back-end latencies between one or more access point and one or more data centers, and the state of the application (e.g., health, such as operational status/state of the target internal application) to select the optimal combination of the access point and the data center resulting in a minimized combined latency between the client and the target application. In a way, the present solution can select the combination of an access point and a data center to connect to, such as to ensure that the client is provided a connection to the target application with the smallest amount of latencies available, given the present state of the system.

Referring now to FIG. 3, an example system 300 for selecting ZTNA access points (e.g., cloud edge nodes) for optimized internal application delivery is illustrated. In brief overview, the example system 300 in FIG. 3 can include one or more clients 102 communicating, via one or more networks 104, with one or more global service load balancer (GSLB) services 305 and one or more data centers 350 via one or more access points 330. The access points 330 can communicate with data centers 350 via one or more tunnels 375. Each access point 330 can for example include a dedicated tunnel 375 with each of the data centers 350 with which the access point communicates. Each client 102 can include one or more client applications 305 and one or more agents 120 that can include one or more front end latencies 320 (e.g., round trip traffic travel time/delay). Each access point 330 can include one or more cloud edge nodes 335, one or more policy engines 340 and one or more latency monitors 380 which can gather/collect/include front end latencies 320 and back end latencies 325. Each GSLB service 325 can include one or more DNS servers 310, one or more latency monitors 380 and one or more measurements database (DB) 315, which can maintain/store/include one or more front and back end latencies 325 and 325, and/or one or more latency monitor lists 385. Each data center 350 can include one or more connectors 335, one or more applications 360, one or more application states 365, one or more back end latencies 325 and/or one or more application monitors 370.

At a high level, the example system 300 of FIG. 3 enables an application 305 from a client 102 device to connect, via a particular access point 330, to an application 360 at a particular data center 350. The particular access point 330 and the particular data center 350 which the system selects can be selected out of a plurality of data centers 350 and a plurality of access points 330 so as to provide the client 102 the least latency/delayed connection out of all possible connections via various combinations of access points 330 and data centers 350 that are available. The system 300 can therefore select a most efficient (e.g., having a least latency) combination of access point 330 and data center 350 that provides the most efficient (e.g., fastest and lowest latency) connection from the client application 305 on the client 102 to the internal application 360 at the present state of the devices on the network 104.

Client 102 can include any user device, such as a laptop, a tablet or a smartphone. Client 102 can include applications providing, handling or using, at least in part, sensitive network traffic, such as enterprise confidential information, emails, documents or other communications that can be provided by data centers 350. Client 102 can include hardware or a combination of hardware and software, such as computer program, code and/or instructions stored in memory and implemented in one or more processors to provide the functionality of the client 102. Client 102 can include the functionality to communicate via network 104 to an access point 330. Client 102 can communicate via an access point 330 and tunnels 375 to data centers 350, including via any connectors 335 and/or to any one or more applications 360. Client 102 can include the functionality to communicate with GSLB services 305, including any DNS servers 310 or measurements DB 315. Client 102 can include the functionality to access a remote application 360 at a particular data center 350, via a particular access point 330. Client 102 can include the functionality to resolve DNS requests for a particular data center 350 or application 360 of interest via a GSLB service 305 or its DNS server 310. Although not illustrated, client 102 can include a latency monitor 380.

Client application 305 can include any hardware or combination of hardware and software, such as computer program, code and/or instructions stored in memory and implemented in one or more processors. Client application 305 can include a mobile application, a desktop application or any other application operating on a client 102. Client application 305 can include the functionality to communicate with applications on other network devices, such as applications 360 on data centers 350, or other network services or devices, such as DNS server 310, DB 315 or access point 330. Client application 305 can include, for example, a streaming audio or video application, a secure shell application, a remote desktop application, an email application or any other application that can utilize or generate network traffic. Client 102 can run any number of client applications 305 which can communicate with any other number of applications 360 on any other number of same or different data centers 350 and via any number of same or different access points 330.

In addition to aforementioned functionality, agent 120 can include any functionality for establishing a connection with a particular access point 330 and/or accessing a particular data center 350 and/or a particular application 360 at such a data center 350. Agent 120 can include hardware or a combination of hardware and software, such as computer programs, code and instructions stored in memory and implemented in one or more processors to provide the functionality of the agent 120. Agent 120 can include the functionality to communicate with a GSLB service 305 and/or DNS server 310 and can resolve DNS requests. Agent 120 can include functionality to configure tunnels 340. Agent 120 can include functionality to implement DNS requests on behalf of client applications 305. Agent 120 can include the functionality to send the requests for connecting to a particular application 360, via a particular access point 330 and a particular data center 350, including a particular connector 335, per the DNS response. Agent 120 can include the functionality to encapsulate and/or decapsulate the network traffic, and can establish any connections or sessions with any network devices.

Access point 330, which can also be referred to as AP 330, or a point of presence (POP) service or a device, can include any demarcation point or a network interface point between communicating entities, such as clients 102 and data centers 350. Access point 330 can include hardware, or a combination of hardware and software, such as computer programs, code and instructions stored in memory and implemented in one or more processors. Access point 330 can be provided by one or more network devices, such as servers. Access point 330 can be provided by a cloud service, such as a service provided by one or more physical or virtual machines operating cloud-based functions. Access point 330 can include an internet service provider (ISP) POP which can include a local access point allowing clients 102 to connect to the internet. Access point 330 can include a POP located at a particular geographical location (e.g., POP location). Access point 330 can include any number or combination of servers, routers, network switches, multiplexers and other network interface equipment. Access point 330 can include an interface for exchanging network traffic between network 104 and an internal local area network, a protected network or a VPN of one or more data centers 350. Access point 330 can include an internet exchange point (IXP) or a colocation center. Access point 330 can include an interface between network traffic from a network 104 and network traffic that can go to and from data centers 350 via tunnels 375. Access point 330 can include one or more cloud edge nodes 335, policy engines 340 and/or latency monitors 380.

A tunnel 375 can include a secured connection between two or more network devices or entities. Tunnel 375 can include a secured connection between an access point 330 and a data center 350. A tunnel 375 can include a protocol that allows for secure movement of data from one network to another or from one device or a cloud service, such as an access point 330, to another device or a cloud service, such as a data center 350. A tunnel 375 can include a secured communication connection/link/session established via a network 104. A tunnel 375 can include a secured communication connection/link/session between network devices or services either directly (e.g., device/service to device/service) or through a network 104. Tunnel 375 can include a direct communication connection/link/session without any intervening or intermediary devices or services. Tunnel 375 can include a communication connection/link/session via one or more intervening or intermediary devices or services. A tunnel 375 can include an IPsec tunnel, a dynamic multipoint VPN or aMPLS-based L3VPN.

GSLB service 305 can include any global service load balancer device or a service for distributing network communication between clients 102 and data centers 350. GSLB service 305 can include hardware or a combination of hardware and software, such as computer programs, code and instructions stored in memory and implemented in one or more processors. GSLB service 305 can be provided by one or more network devices, such as network servers, DNS servers 310, VPN servers or similar. GSLB service 305 can be provided by a cloud-based service which can be hosted on one or more network devices. GSLB service 305 can include the functionality to track front end latencies 320 and back end latencies 335. GSLB service 305 can include the functionality to monitor latencies 320 and 325 from a plurality access points 330 (e.g., all access points 330). GSLB service 305 can include the functionality to utilize a latency monitor list 385 to determine the most optimal combination of access point 330, data center 350 and/or application 360 for any particular client 102 at any given point. GSLB service 305 can provide in DNS responses the combination of access point 330, data center 350 and/or application 360 most suitable for a client 102.

Data center 350, which can sometimes also be referred to as a demilitarized zone (DMZ) can include any number of computing or network devices at a region or a site providing secured network services or applications. For example, a data center 350 can include servers 106, clients 102 or 165 or any other infrastructure discussed herein. Data center 350 can be protected from external network traffic and only authorized clients 102 can access the data center's applications or services. Data center 350 can include or have its devices connected via, a private cloud 175, or a VPN. A data center 350 can include a device or a functionality that identifies devices, such as servers 106 or clients 102/165, to which to forward network traffic to and from clients 102. Data center 350 can include connectors 335, servers 106 and/or cloud services that can provide applications 360. Data center 350 can include servers 106 combined with VPN servers 195 to provide cloud-based services. Although not illustrated, data center 350 can include a latency monitor 380.

Depending on the design, the ZTNA system of the present solution can have all incoming connections performed over one or more tunnels that can be open from inside-out, rather than requiring an appliance/server listening for inbound connections (as is the case with DMZs). In some implementations, network devices illustrated as deployed in a data center 350 can be deployed in some other configurations outside of a data center 350.

Front end latency 320, or front end latencies 320, can include any number of measurements or determination of network delay between one or more clients 102 and one or more access points 330. Front end latency 320 can include measurements or determinations of time it takes for network traffic to be transmitted from one point (e.g., a particular client 102) to another point (e.g., a particular access point 330). Front end latency 320 can include the time it takes for network traffic to travel in one direction between two points and/or time it takes for a roundtrip communication between two points (e.g., from first point to the second point and back). Front end latency 320 can include a plurality of measurements or determinations of network delay between one or more number of clients 102 and one or more access points 330. For example, front end latency 320 can include a compilation of latencies (e.g., network delays) between a plurality of clients 102 and a plurality of access points 330. Front end latency 320 can include a compilation of latencies between a plurality of clients 102 and a particular access point 330. Front end latency 320 can include a compilation of latencies between a client 102 and a plurality of access points 330. For example, front end latency 320 can include front end latencies of a particular access point 330 and plurality of clients 102 from a plurality of geographical locations. A front end latency 320 can include front end latencies of a particular client 102 and a plurality of access points 330 from a plurality of geographical locations.

Back end latency 325 or back end latencies 325, can include any number of measurements or determination of network delay between one or more data centers 350 and one or more access points 330. Back end latency 325 can include measurements or determinations of time it takes for network traffic to be transmitted from one point (e.g., a particular data center 350 or a connector 335 at a data center 350) to another point (e.g., a particular access point 330). Back end latency 325 can include time it takes for network traffic to travel in one direction between two points and/or time it takes for a roundtrip communication between two points (e.g., from first point to the second point and back). Back end latency 325 can include a plurality of measurements or determinations of network delay between one or more data centers 350, or one or more connectors 335 of data centers 350, and one or more access points 330. For example, back end latency 325 can include a compilation of latencies (e.g., network delays) between a plurality of data centers (e.g., plurality of connectors 335) and a plurality of access points 330. Back end latency 325 can include a compilation of latencies between a plurality of data centers 350 (e.g., connectors 335) and a particular access point 330. Back end latency 325 can include a compilation/aggregate/combination of latencies between a single data centers 350 (e.g., a connector 335) and a plurality of access points 330. For example, back end latency 325 can include back end latencies of a particular access point 330 and plurality data centers 350 (e.g., connectors 335) from a plurality of geographical locations. Back end latency 325 can include back end latencies of a particular data center 350 and plurality of access points 330 from a plurality of geographical locations. Back end latency 325 can include the latency associated with the application 360 on the data center 350.

Latency monitor 380 can include any functionality for monitoring front end latencies 320 and back end latencies 325. Latency monitor 380 can include hardware, or a combination of hardware and software, such as computer programs, code and instructions stored in memory and implemented in one or more processors. Latency monitor 380 can keep track of a plurality of front end latencies 320 between one or more clients 102 and one or more access points 330 as well as a plurality of back end latencies 325 between one or more access points 330 and one or more data centers 350 and/or connectors 335. Latency monitor 380 can receive updates of front end latencies 320 and back end latencies 325 and can update the front and back end latencies 320 and 325 accordingly. Latency monitor 380 can include the functionality to identify or select particular front and back end latencies 320 and 325 that are lowest or highest in comparison across the latencies 320 and 325. Latency monitor 380 can rank front and back end latencies 320 and 325 based on the magnitude of their latencies/delays, such as for example in an increasing fashion. Latency monitor 380 can include the functionality to select front and back end latencies 320 and 325 that are lowest (e.g., combine for a lowest delay for a client 102 to access a particular application 360 on a data center 350).

Cloud edge node 335, or an edge node 335, can include one or more network devices or cloud-based services that can act/operate as an end user portal for communication with other nodes. Cloud edge node 335 can include hardware or a combination of hardware and software, such as computer programs, code and instructions stored in memory and implemented in one or more processors. Cloud edge node 335 can include a node, such as a gateway node and/or edge communication node in a distributed computing environment. Cloud edge node 335 can operate on, or include, one or more physical devices, such as servers 106, VPN servers 195 and/or virtual machines. Cloud edge node 335 can manage access to data centers 350, including authenticating and/or authorizing users of client 102 devices to access applications 360 of the data center 350. Cloud edge node 335 can include functionality for managing network traffic between clients 102 on a network 104 and data centers 350. Cloud edge node 335 can include the functionality to establish, manage and maintain tunnels 375. Cloud edge node 335 can include the functionality to measure front and back end latencies 320 and 325.

Policy engine 340 can include any type and form of a policy engine or a set of rules for managing network traffic between clients 102 and data centers 350. Policy engine 340 can include hardware or a combination of hardware and software, such as computer programs, code and instructions stored in memory and implemented in one or more processors. Policy engine 340 can include rules for directing network between clients 102 and connectors 335 on data centers 350. Policy engine 340 can include rules for managing communication between applications 305 on clients 102 and applications 360 on data centers 350.

DNS server 310 can include any domain name server or a functionality on a network 104. DNS server 310 can receive a uniform resource locator (URL) from a client 102 and can provide the domain name received into a numeric IP address to which the domain name corresponds. DNS server 310 can provide an IP address of a domain name requested by a client application 305, which then agent 120 can use or modify to provide a request to a particular access point 330 to access an application 360 at a particular data center 350. DNS server 310 can include the functionality to interact with latency monitor 380 and/or latency monitor list 385 to provide a DNS response along with information of a particular access point 330 and a particular data center 350 providing the requested application 360. DNS server 310 can provide a DNS response to a DNS request from a client 102 in response to determining the access point 330 and the data center 350 with least total latency (e.g., front end and back end latencies 320 and 325). DNS server 310 can provide a DNS response in response to application state 365 (e.g., health state) of an application 360.

Measurements database 315, also referred to as a measurements DB 315, database 315 or DB 315, can include any organized collection of structured information or data stored in memory. Measurements DB 315 can include a file system and/or tables of information. DB 315 can store any information or metadata on connections between clients 102 and access points 330 and access points 330 and databases 350. Measurements DB 315 can store any information or metadata on applications 305, applications 360 and their communications, as well as any data on access points 330, clients 102 and data centers 350. Measurements DB 315 can store front end latency 320, back end latency 325 and latency monitor list 325. Measurements DB 315 can include DNS server 310 information, including collection of IP addresses and/or hostnames, such as for example for various access points 330, data centers 350 and applications 360.

Latency monitor list 385 can include any front end latencies 320 and back end latencies 325. Latency monitor list 385 can include a list or a collection of all front and back end latencies 320 and 325 in a single collection, list or a table, a lookup table or a database structure. Latency monitor list 385 can be updated periodically or per updates from access points 330, clients 102 and/or data centers 350. Latency monitor list 385 can list all current latencies/delays between one or more access points 330 and one or more clients 102 and/or latencies/delays between one or more access points 330 and one or more data centers 350. Latency monitor list 385 can be managed by a latency monitor 380. The latency monitor 380 can apply its functionality to determine the combination of access points 330, data centers 350 and/or applications 360 that amount to a shortest total latency/delay (e.g., shortest combination of front and back end latencies 320 and 325 along with highest/acceptable health level or application state 365 of an application 360).

Connector 335 can include any device, function, hardware or a combination of hardware and software for managing and routing network traffic to and from a data center 350. Connector 405 can receive, encapsulate and/or decapsulate, encrypt and/or decrypt the network traffic traversing data center 350. Connector 405 can include the functionality for creating and maintaining tunnels 375 between the data center 350 and an access point 330. Connector 335 can include a latency monitor 380.

Application 360, which can also be referred to as the internal application 360, can include any hardware, software, combination of hardware and software and computer program, code and/or instructions stored in memory and implemented in one or more processors. Application 360 can include an application accessed remotely, over an access point 330 and/or tunnel 375 by a client 102 and/or a client application 305. Application 360 can include, for example, a secured file storage, confidential information, streaming audio or video application(s), one or more secure shell applications, one or more remote desktop applications, one or more email applications or any other application that can utilize or generate network traffic. Data center 350 can run any number of applications 360 of the same or a different type or instance. Each of the types or instance of applications 360 on a data center 350 can include its own application state 365.

Application state 365 can include any information or indication of the state of a particular application 360 type or instance. An application state 365 can include a state of health/operation or an information on the health of a particular application 360, or an instance of an application, in a data center 350. Application state 365 can include information on a delay or latency caused by the application 360, or its instance or type. For example, application state 365 can include information on application's reliability (e.g., that it is reliable or unreliable), on application's activity (e.g., that it is active or inactive), on application's usage (e.g., the amount of clients 102 that access the application. Application state 365 can include information on the level of usage of the application 360, including for example the number of clients 102 accessing the application 360 at the data center 350, out of a total number of clients 102 that are allowed to access the application. For example, application state 365 can include the present capacity for the application 360, such as how overwhelmed is the application 360 and its resources or how many more clients 102 can connect to the application 360 (e.g., how many available spots for new clients 102 are there left). As a data center 350 can run any number of types or instances of an application 360, each type or an instance of application 360 can include its own application state 365.

App monitor 370, or application monitor 370, can include any function for monitoring the state of the application 360 and generating application state 365. Application monitor 370 can include any hardware or combination of hardware and software, such as computer program, code and/or instructions stored in memory and implemented in one or more processors. Application monitor 370 can include the functionality for measuring the state of health of an application. Application monitor 370 can ping/poll the application 360 periodically and can update the state 365 of the application accordingly.

The example system 300 illustrated in FIG. 3 can be used for selecting access points 330, data centers 350 and applications 360 to minimize the overall latency/delay that the client 102 can experience. In some aspects, FIG. 3 relates to at least one network node (e.g., 305) that can include at least one processor. The at least one network node can include a GSLB service 305, which can be deployed on any network device or service, such as a server 106, VPN server 195, a cloud service or access point 330. The at least one processor can be configured to access a first plurality of measurements of network latency (e.g., 320) between a plurality of access-points (e.g., 330) and the first client device (e.g., 102) and a second plurality of measurements of network latency (e.g., 325) between the plurality of access-points (e.g., 330) and a plurality of data centers (e.g., 350). The at least one processor can be configured to receive, from one or more data centers (e.g., 350) of the plurality of data centers, health (e.g., 365) of an application (e.g., 360) deployed across the one or more data centers (e.g., 350). The at least one processor can be configured to determine, according to the first plurality of measurements (e.g., 320), the second plurality of measurements (e.g., 325) and the health (e.g., 365) of the application (e.g., 360), a first data center (e.g., 350) of the one or more data centers and a first access-point (e.g., 330) of the plurality of access-points. The at least one processor can be configured to send, to the first client device (e.g., 102), a domain name system (DNS) response identifying the first access-point (e.g., 330) and the first data center (e.g., 350). The at least one processor can be configured to implement these tasks using instructions that can be stored in memory and executed on the at least one processor.

The at least one processor can be configured to receive a DNS request from the first client device (e.g., 102) for the application (e.g., 360). The at least one processor can be configured to receive the first plurality of measurements (e.g., 320) from an agent (e.g., 120) of the first client (e.g., 102), and the second plurality of measurements (e.g., 325) from the plurality of data centers (e.g., 350). For example, data centers 350 can be connected to network 104 and can transmit the second plurality of measurements 325 via the network 104.

The at least one processor can be configured to store, in a database, the first plurality of measurements (e.g., 320) and the second plurality of measurements (e.g., 325). The at least one processor can be configured to determine the first data center (e.g., 350) by eliminating or downgrading at least one of the one or more data centers where health (e.g., 365) of the application (e.g., 360) is degraded relative to health (e.g., 365) of the application (e.g., 360) deployed at the first data center (e.g., 350).

The second plurality of measurements (e.g., 325) can comprise network latencies between the plurality of access-points (e.g., 330) and a plurality connector devices (e.g., 335) of the plurality of data centers (e.g., 350). The least one processor can be configured to determine that the first access-point (e.g., 330) and the first data center (e.g., 350)

corresponds to a least combined network latency (e.g., 320 and 325) among those corresponding to pairs of an access-point (e.g., 330) and a data center (e.g., 350) from the one or more data centers and the plurality of data centers.

The at least one network node (e.g., 305) can include a first measurement of the first plurality of measurements (e.g., 320), which can include a round-trip time of a packet communicated between the first client device (e.g., 102) and a first access-point (e.g., 330) of the plurality of access-points. The at least one network node can also include a second measurement of the second plurality of measurements (e.g., 325), which can include a round-trip time of a packet communicated between one of the plurality of access-points and one of the plurality of data centers. The DNS response can include metadata or a DNS extension to indicate the first data center (e.g., 330).

In some aspects, FIG. 3 relates to a non-transitory computer-readable medium storing instructions that, when executed by at least one processor of a service (e.g., 305), cause the at least one processor to implement multiple tasks. The at least one processor of the service (e.g., 305) can access a first plurality of measurements (e.g., 320) of network latency between a plurality of access-points (e.g., 330) and the first client device (e.g., 102) and a second plurality of measurements (e.g., 325) of network latency between the plurality of access-points (e.g., 330) and a plurality of data centers (e.g., 350). The at least one processor can receive, from one or more data centers (e.g., 350) of the plurality of data centers, health (e.g., 365) of an application (e.g., 360) deployed across the one or more data centers (e.g., 350). The at least one processor can determine, according to the first plurality of measurements (e.g., 320), the second plurality of measurements (e.g., 325) and/or the health (e.g., 365) of the application (e.g., 360), a first data center (e.g., 350) of the one or more data centers and a first access-point (e.g., 330) of the plurality of access-points and send, to the first client device (e.g., 102), a domain name system (DNS) response identifying the first access-point (e.g., 330) and the first data center (e.g., 350).

The at least one processor of a service (e.g., 305) can determine (e.g., select, identify/choose) the first data center (e.g., 350) by eliminating or downgrading at least one of the one or more data centers where health (e.g., 365) of the application (e.g., 360) is degraded relative to health (e.g., 365) of the application (e.g., 360) deployed at the first data center (e.g., 350).

Referring now to FIG. 4, an example of a (e.g., ZTNA) system 400 is illustrated. ZTNA can include a category of technologies that provides secure remote access to applications and services based on defined access control policies. Unlike VPNs, which can for example grant complete access to a LAN, ZTNA solutions can default to deny access, while providing access to those clients to whom access to services the user has been granted. ZTNA can include a combination of a cloud-based trust access broker which can evaluate access requests to the applications and an on-premises connector appliance which can provide VPN-less access to internal applications.

In FIG. 4, a user on a client 102 can attempt to access an internal application 360 using a corresponding client application 305 installed on client 102 device, which can include a smartphone, a personal computer or a tablet, for example. The request from the client 102 can be intercepted by an agent 120 which can redirect this request to an AP 330 (e.g., a ZTNA Cloud POP), and in particular, to an edge node 335 within this POP. The edge node 335 can work in tandem with the agent 120 to force a user login (if the user has not authenticated yet). The edge node 335 can check if the user on the client 102 is entitled to access the internal application 360. Towards this end, multiple sources may be used to retrieve said evaluation criteria for the user of the client 102 and/or the client 102 itself, including but not limited to user identity, directory group membership, user network location, user equipment device posture (compliant/non-compliant), user behavior and app behavior analytics indicating a user/app risk score and others. Such criteria can be evaluated against a policy engine 340 which can determine whether the application access request is allowed or not. The edge node 335 can connect to the application 360 via a tunnel 375 that has been previously established by a connector 335 connecting to the AP 330 (e.g., the cloud POP).

Referring now to FIG. 5, an example of a (e.g., geo-redundant ZTNA) system 500 is illustrated. In some implementations, in order to provide redundancy and improve user experience, a ZTNA trust broker can be deployed across multiple access points 330 (e.g., POPs), including for example tens or hundreds of them.

System 500 can therefore include a ZTNA system with multiple access points 330 (e.g., POPs). A DNS service can be coupled with a static proximity GSLB service 305 which can be employed in the application access workflow, similar to the way discussed in connection with FIG. 4. This can allow the agent 120 (e.g., the ZTNA agent) to connect to a cloud-edge node 335 on the access point 330 that is located in the geographically closer location to the client 102. For instance, in FIG. 5, users on client 102 devices from Europe and India can get connected to the European AP 330 (e.g., POP @ Europe), whereas the users on client 102 devices from the USA can get connected to the AP 303 in the US (e.g., POP @ USA). Such an approach can improve user experience and provides redundancy. For example, the USA users can connect to the European AP 303 in case of a USA AP 303 outage or maintenance event, and still continue to enjoy access to the internal applications 360, even at a cost to user experience in terms of longer latencies/delays.

Internal applications 360 may also be deployed in a geo-redundant manner. For example, in some implementations ZTNA solutions can optimize for hop-by-hop delivery, connecting users (e.g., clients 102) to the customer data center 350 that is geographically closer to the AP 330 (e.g., the cloud POP) that the ZTNA agent has connected to, as further discussed in FIG. 6 below.

Referring now to FIG. 6, an example of a (e.g., geo-redundant ZTNA) system 600 with multiple access points 330 and multiple data centers is illustrated. In some instances, in order to improve user experience, ZTNA system providers can employ many AP 330 POPs across various geographical areas, in order to cover as much terrain as possible. This can include also internal applications 360 deployed at data sites 350 that can be deployed across multiple geographical locations, thereby covering different parts of the globe. For instance, customers in the USA can be directed by system 3600 to an AP 330 that is a dedicated USA POP, and from that POP they can be directed to a geographically closer data center 350.

However, one problem with the conventional geo-redundant solutions, such as these can be, that it can be limited to only hop-by-hop optimization. For instance, a user located in Israel can attempt to access an internal application in Australia through a ZTNA solution with POPs in USA, Central Europe and Southeast Asia. From an actual latency/delay standpoint, the actual optimal path for this user/client 102 can be to connect the user across the globe to the Southeast Asia POP and from there to Australia. However, ZTNA solutions typically pick-up the POP geographically closer to the user, which in this case could be a POP in Central Europe, and in doing so effectively adding 50-70 ms of latency, significantly worsening the user experience, even though the user may be connected to the geographically closest option. In this instance, the geographically closest option may not result in the combination of AP 330 and data center 350 that provides for the least latency/delayed response. In another example of conventional ZTNA system which the present solution improves upon, a user located in Greece can attempt to access an internal application 360 in data centers 350 in Central Europe and USA through a ZTNA solution with AP 330 (e.g., POPs) located in Central Europe and USA respectively. However, a border gateway protocol (BGP) misconfiguration can occur and cause that network traffic intended to be routed to the Central Europe POP (e.g., AP 330 in Central Europe) is currently routed through the AP 330 in the USA for this user's ISP. The conventional selection of Central Europe can mean that a "Greece—USA—Central Europe" path is selected, rather than the optimal "Greece—USA" path which would result in the minimized latency/delay. In another example, connectivity between the AP 330 in Central Europe and the corresponding connector 335 at a data center 350 may be suffering from intermittent failures or high latencies at the back end, to which the client 102 may have no privy. In this instance, it can be preferable to send even European users to USA, so as to improve user experience until the situation resolves in the geographically close AP 330 in the Central Europe. Intermittent events that can adversely affect, latencies, error rates and availability of intermediary network links and computing systems and hence adversely affect the user experience can be both common and unpredictable in a complex internet environment. To reduce such uncertainties, data corresponding to network latencies, error rates and availability can be taken continuously or periodically to ensure that updated information is used by the system.

A more generic description of the problem with the conventional geo-redundant solutions can be formalized with an example in which there is an N number of ZTNA AP 330 POPs, with variable latencies RTTp[i] to the end-user, depending on geographical location and current state of intermediate networks (1<=i<=N). An internal application 360 can be deployed in an M number of customer datacenters, with variable latencies RTTdc[k] to the ZTNA POPs above (1<=k<=N). Once the user (e.g., on a client 102) tries to access an internal application 360, the user's request can be routed through the appropriate combination of ZTNA POP i to customer datacenter k so as to minimize RTTp[i]+ RTTdc[k]. This can lead to a hop-by-hop optimization methodology which can result in the issues stated in the examples above.

The present solution can combine both the hop by hop optimization and geography. The present solution can address the above-stated issues by making the determination for the combination of AP 330 and data center 350 for the user/client 102 based on the most updated information about the front and back end latencies 320 and 325 as well as the health status of the application 360 itself and not based on geography alone. The present solution can provide for systems and methods to place internal applications 360 across multiple customer data centers 350 and select the optimal (e.g., least latent/delayed) customer data center 350 and the application 360, as well as the optimal access point 330 to serve the internal application 360 to a particular client 102.

Referring now to FIG. 7, an example system 700 of the present solution is illustrated in which an optimal (e.g., lowest latency) selection of an access point 330 and data center 350 and its internal application 360 is selected from multiple access points 330 and multiple data centers 350 providing multiple internal applications 360 of the same or a different type. System 700 can utilize GSLB service 305 to manage selection of the optimal AP 330, data center 350 and/or application 360, and can inform the client device of the selected combination in a DNS response to client device's DNS request to access the application 360.

In the present solution, real user measurements (RUMs) of the front end latencies 320 can be collected by end-users' ZTNA agents 120 on clients (also referred to as client devices) 102 that can constantly measure the round-trip-time (RTT) of network traffic between potentially thousands or millions of end-users/clients 102 and the access points 330 (e.g., the ZTNA POPs). The RUMs of the back end latency 325 collected for by the connector 335 appliances can be used to constantly measure/determine the RTT between customer data centers 350 and the access points 330 (e.g., the ZTNA POPs) on the back end. In addition, a health-check component (e.g., application monitor 370) that can run within or alongside connector 335 can constantly monitors the health (e.g., application state 365) of the internal application 360 at each customer data center 350. Moreover, an internet based GSLB as a Service solution (e.g., 305) can operate for example a Citrix Intelligent Traffic Manager. The GSLB service 305 can utilize the front and back end latencies 320 and 325 as well as the up-to-date application state 365 of the application 360 to optimize the selection of the optimal access point 330 (e.g., the ZTNA POP) and the back end customer data center 350 for each client 102.

The example system 700, shown in FIG. 7, can reflect a high level architecture of the control plane of the present solution. For example, latency monitors 380, which can also be referred to as benchmark hosts, can be deployed in each AP 330 (e.g., ZTNA POP). These benchmark hosts can enable the collection of RUMs, measuring the latency (round-trip time) between the end user and the ZTNA POP. While the exact protocol and method to collect the measurements can vary, in one example, the system 700 can use HTTP(S) download of one or more objects (e.g., of a set size), as HTTP(S) is usually allowed to go through any potential firewalls and other network security appliances, thereby not being likely to be interrupted. Agent 120 (e.g., the ZTNA agent on the client 102) can periodically collect RUMs to measure the reachability of access points 330 (e.g., ZTNA POPs) in real-time as shown, for example, in FIG. 8 below.

FIG. 8 illustrates a flowchart of a method or process 800 of gathering and/or collecting front end latencies 320 between one or more agents 120 of one or more clients 102 and one or more access points 330. Although the method 800 illustrated in FIG. 8 shows a single agent 120 (e.g., the ZTNA agent of the user) collecting measurements with multiple access points 330, it is understood that the same process can be implemented with a plurality of agents 120 on a plurality of clients 102 and a plurality of access points 330. Likewise, although FIG. 8 illustrates an example in which measurements are performed by an agent 120, it is understood that one or more agents and/or access points 330 can also perform the same function as that performed by agent 120 in the method 800, using the same or similar steps as 801-804 performed by agent 120 in the method 800. The method 800 can include steps 801 to 804.

The method or process 800 of collecting RUMs can begin with the step 801 of getting the host list. At step 801, the agent 120 can request a list of latency monitors 380 (e.g., the benchmark hosts) from an inventory service (e.g., latency monitor list 385) at a GSLB service 305. The agent 120 can request the list in response to a prior request from the GSLB service 305. The GSLB service 305 can determine that the latency monitor list (e.g., the benchmark host list) is to be updated and that the agent 120 on the client 102 is suitable to perform particular benchmark measurements for the front end latencies 320 against several access points 330.

At step 802, the GSLB service 305 can utilize the latency monitor list 385 to select the host list (e.g., benchmark hosts) for the agent 120 (e.g., the ZTNA agent) of the client 102. The access points 330 against which the client 102 can collect the RUM measurements can be selected randomly by the GSLB 305 and/or its latency monitor list 385. For example, the GSLB 305 can utilize the latency monitor light 385 (e.g. the benchmark host list) to select the access points 330 for the client 102 to collect the RUM measurements for the front end latency 320. Once selected, the GSLB service 305 can return the list of selected access points 330 (e.g., in a response) to the end user (e.g. client 102). In the response to the agent 120, the latency monitor list 385 and/or GSLB service 305 can include all data or information on or from all latency monitors 380 (e.g., benchmark hosts) across all access points 330 (e.g., ZTNA POPs). In some implementations, the latency monitor 385 list may not include data or information on or from all benchmark hosts across all the ZTNA POPs.

At step 803, the measurements can be collected between the agent 120 and the one or more access points 330 that have been selected. The measurements can include the RUMs, including for example round trip time (RTT) measurements between the client 102 and each of the access points 330. The measurements can be taken periodically from potentially millions of end-user devices (e.g., clients 102). Measurements can be aggregated and/or organized on various bases, such as for example on the basis of a country, a region, an internet service provider (ISP), one or more POPs and/or one or more data centers 350. The user (e.g., client 102) can collect the RUM/RTT measurements for the front end latency 320 and store them locally. Agent 120 can take several RTT or RUM measurements with each access point 330. Each measurement can corresponds to an IP address of the access point 330 (e.g., IP of the POP).

At step 804 of the method 800, the RUM or RTT measurements can be sent by the agent 120 to the GSLB service 305 and can be uploaded to the measurements DB 315. At this point, the user IP (e.g., client 102 IP) can be translated to an ISP and a Country, so as to allow anonymization of privately identifiable information (IP address) and any compliance with local legislation protecting such information. The measurements taken can then be inserted into the database 315 under front end latencies 320. For example, the measurements can be inserted into the measurements DB 315 as a {Country, ISP, POP, RTT} tuple along with any other information for the client 102 and/or access points 330 for which RTT/RUM measurement were taken.

FIG. 9 illustrates a flowchart of a method or process 900 of gathering and collecting back end latencies 325 between one or more data centers 350 and one or more access points 330. Although the method 900 illustrated in FIG. 9 shows a connector 335 on a single data center 350 collecting measurements, it is understood that the same process can be implemented with a plurality of connectors 335 on a plurality of data centers 350 and/or a plurality of access points 330. Likewise, although FIG. 9 illustrates an example in which measurements are performed by a connector 335, it is understood that one or more access points 330 can also perform the same function as that performed by the connector 335 in the method 900, using the same or similar steps as 901-904 performed by the connector 335 in the method 900. The method 900 can include steps 901 to 904.

The method or process 900 of collecting RUMs can begin with the step 901 of getting the host list. At step 901, the connector 335 can request a list of latency monitors 380 (e.g., the benchmark hosts) from an inventory service (e.g., latency monitor list 385) at a GSLB service 305. The connector 335 can request the list in response to a prior request from the GSLB service 305. The GSLB service 305 can determine that the latency monitor list (e.g., the benchmark host list) is to be updated and that the connector 335 on the client 102 is suitable to perform particular benchmark measurements for the back end latencies 325 against several access points 330.

At step 902, the GSLB service 305 can utilize the latency monitor list 385 to select the host list (e.g., benchmark hosts) for the connector 335 of the data center 350. The access points 330 against which the connector 335 can collect the RUM measurements can be selected randomly by the GSLB service 305 and/or its latency monitor list 385, just as with step 802 in method 800. In some instances, the GSLB service 305 can provide the entire list of access points 330 to the connector 335. Once selected and/or gathered, the GSLB service 305 can return the list of selected access points 330 to the connector 335.

At step 903, the measurements can be collected between the connector 335 and the one or more access points 330 selected. The measurements can include the RUMS, including for example round trip time (RTT) measurements between the connector 335 and each of the access points 330. Just as with the step 803 in method 800, the measurements can be taken periodically and can be aggregated and/or organized on various bases, such as for example on the basis of a country, a region, an internet service provider (ISP), one or more POPs and/or one or more data centers 350. The connector 335 can collect the RUM/RTT measurements for the back end latency 320 and can store them locally. Connector 335 can take several RTT or RUM measurements with each access point 330. Each measurement can corresponds to an IP address of the access point 330 (e.g., IP of the POP). Since there are usually fewer access points 330 than clients 102, unlike in step 803 of method 800, in the present step it is more likely that connector 335 can be asked to evaluate RUMs/RTTs against all access points 330, thereby providing back end measurements 325 between the data center 350 of the connector 335 and each and every AP 330 of the system.

At step 904 of the method 900, the RUM or RTT measurements can be sent by the connector 335 to the GSLB service 305 and uploaded to the measurements DB 315. The measurements taken can then be inserted into the database 315 under front end latencies 320. For example, the measurements can be inserted into the measurements DB 315 as a {Customer datacenter #id, POP, RTT} tupleand/or access points 330 for which RTT/RUM measurement were taken.

FIG. 10 illustrates a flowchart of a method or process 1000 of gathering and/or collecting, by GSLB service 305, application state 365 information (e.g., health of an application 360) at a data center 350. The health status can be indicative of the latency of the application 360 itself. The method 1000 can include steps 1001 to 1003.

At step 1001, application monitor 370 can issue a health check to an application 360 at a data center 350. The application monitor 370 (e.g., a health check function) can be included within, controlled by or collaborate with a connector 335. The health check performed by the application monitor 370 can include a request from the connector 335 and/or application monitor 370 to the application 360. The request can include a ping (or a polling request) to the application 360, or any other request that can be used to measure or determine the responsiveness of the application 360. The health-check request can be customizable, depending on the application 360. For example, the request can include an HTTP request that can expect a 200/success response code. The request can expect a certain response (e.g., message content and//or format). The request can include a TCP health-check. The application health can be periodically monitored by the connector 335 component, such as the application monitor 370. The health check can be issued in response to a request from GSLB service 305 requesting that the connector 335 and/or application monitor 370 check on the status (e.g., 365) of the application 360.

At step 1002, the application 360 sends a response indicating the health of the application 360 to the application monitor 370 and/or connector 335. The response can indicate the responsiveness of the application 360. The response can be responsive to the request at step 1001 and can include the information requested or expected by the request 1001. The response can include data or information about the application workload, number of clients or users being serviced or amount of resources available for the application. The result can include, for example, a {Customer datacenter #id, app #id, Success/Fail} tuple.

At step 1003, the application monitor 370 and/or connector 335 can send the upload health status transmission to the measurements DB 315 and/or GSLB service 305. The transmission can include the application state 365 of the application 360. The transmission content can be uploaded to the latency monitor list 385. The whole health-check procedure, under method 1000, can be performed and repeated periodically, such as every minute, every 10 seconds, 20 seconds, 30 seconds, or every 1, 2, 3, 5, 10 or 15 minutes, or in response to a specific trigger/condition.

Once the front end latencies 320, back end latencies 325 and application statuses 365 are received using, for example, methods 800, 900 and/or 1000, the received data can be combined by the GSBL 305 into the database DB 315. The received update data 320, 325 and 365 can be updated for example into the latency monitor list 385.

Measurements in the database can be combined so as to include application latency (e.g., application state 365) for a given application 360 at a given data center 350 if the application 360 is determined to be healthy, or alternatively it can be set at infinity (or weighted to have a larger latency) if the application is unhealthy (e.g., nonfunctional or not present). Assuming there is any number N of access points 330 (e.g., ZTNA POPs) and any number L of data centers 350 and assuming that the application 360 is deployed across M of said datacenters (e.g., assuming that M<L), then a table or a matrix can be created for each application 360 based on the input.

For example, if the number of access points 330 is N=4, and number of data centers 350 is L=10, while the number of data centers 350 at which application 360 is deployed is equal to M=4, such that the application is deployed on datacenters 2, 3, 5, 7 and an unhealthy application 360 is on datacenter-7, then the table or matrix can be as shown in Table 1 below:

TABLE 1

| app1 | DC-1 | DC-2 | DC-3 | DC-4 | DC-5 | DC-6 | DC-7 | DC-8 | DC-9 | DC-10 |
|---|---|---|---|---|---|---|---|---|---|---|
| | | | | sample internal app measurements (e.g., application state 365) | | | | | | |
| POP-1 | inf | 173 | 37 | inf | 104 | inf | inf | inf | inf | inf |
| POP-2 | inf | 88 | 54 | inf | 159 | inf | inf | inf | inf | inf |
| POP-3 | inf | 73 | 109 | inf | 73 | inf | inf | inf | inf | inf |
| POP-4 | inf | 29 | 105 | inf | 107 | inf | inf | inf | inf | inf |

The table 1 can be included in the DB 315 and/or latency monitor list 385. As shown above, the table 1 includes rows of POPs 1-4, which can correspond to four different access points 330, whereas columns can correspond to data centers 350, and the corresponding entries in each of the columns can identify which applications 360 (e.g., at which data center 350) are functional, and which are not.

Similarly, the front end and back end latency measurements 320 and 325 (e.g., RUMs and/or RTTs) can be stored in similar matrix or matrices or table(s), such as the one shown in Table 2 below:

TABLE 2

Latency matrix/table

| | {country, ISP} | {country, ISP} | {country, ISP} | ... | {country, ISP} |
|---|---|---|---|---|---|
| POP-1 | | | | | |
| POP-2 | | | | | |
| POP-3 | | | | | |
| POP-4 | | | | | |

Once a user tries to connect to an internal application 360, a single column can be selected from the above-provided matrix or a table, corresponding to the user's ISP and country, as shown as an example in Table 3 below:

TABLE 3

User to POP latency

| | {country, ISP} |
|---|---|
| POP-1 | 101 |
| POP-2 | 168 |
| POP-3 | 80 |
| POP-4 | 124 |

For example, in the context of the Table 3 above, an opportunistic approach to AP 330 (e.g., POP) selection can result in the pick-up POP-3 with a latency of 80 ms as it is the lowest latency entry. The end-to-end latency for this selection, factoring all other latencies, would be about 153 ms or more.

However, if the latencies from Table 3 are added as "penalties" to the latencies in Table 1, then we can see that selecting the best path for the client 102 to access an application 360 is not done best using the opportunistic approach. This can be seen, for example in Table below which aggregates the application latency (e.g., application state 365 or health) along with front end and back end latencies 320 and 325 (e.g., the user RUMs and data center RUMs). Note that for convenience in Table 4, below, only data centers 350 in which application 360 is functional (e.g., healthy) and deployed are shown:

TABLE 4

| | Combined POP + data center latency for app 360 | | |
|---|---|---|---|
| app1 | DC-2 | DC-3 | DC-5 |
| POP-1 | 173 + 101 = 274 | 37 + 101 = 138 | 104 + 101 = 205 |
| POP-2 | 88 + 168 = 256 | 54 + 168 = 222 | 159 + 168 = 327 |
| POP-3 | 73 + 80 = 153 | 109 + 80 = 189 | 73 + 80 = 153 |
| POP-4 | 29 + 124 = 153 | 105 + 124 = 229 | 107 + 124 = 231 |

From the data in Table 4, considering both front end and back end latencies 320 and 325, along with the fact that only functional and deployed applications 360 are included in Table 4, based on the combination of these three factors we can find the optimal (e.g. lowest latency) option to be the access point 330 that in this example is POP-1 and a data center 350 that in this example is DC-3. The combination of POP-1 and DC-3 are the best combination of AP 330 and data center 350, despite the fact that neither POP-1 nor DC-3 are the optimal opportunistic choices given their individual latencies to the access point 330, such as the POP-3, alone. Particularly, in this example, when considering front end latencies 320 alone, the best POP based on the user-end RUMs is POP-3, with about 20% lower RTT than the POP-1 (e.g., 80 ms vs. 101 ms). Similarly, from the opportunistic standpoint when considering back end latencies 325 alone, the best performing data center 350 is DC-2, with 29 ms with respect to POP-4, which is about 25% lower latency than the 37 ms latency of DC-3 with respect to POP-1. Yet, when combining the overall front end and back end latencies 320 and 325, the overall latency of POP-1/DC-3 amounts to 138 ms, approximately 10% better than the next better ones (POP-3+DC-2, POP-3+DC-5 and POP-4+DC-2 at 153 ms) in this example.

Referring now to FIG. 11, a flowchart of a method or process 1100 for selecting the combination of an access point 330 and a data center 350 based on front end latencies 320, back end latencies 325 and/or application states 365 (e.g., health), and making the connection for the client 102 to the target application 360. Method 1100 can provide steps or acts for selecting or determining an access point 330 out of a plurality of access points 330, and determining a data center 350 out of a plurality of data centers 350, that can result in a combined minimized (e.g., optimized) latency for the client 102 to access the target application 360 at a data center 350. Method 1100 can include steps or acts 1101-1108.

At step 1101, a connector 335 can establish a cloud tunnel 375 between a data center 350 and an access point 330. In some implementations, a plurality of connectors 335 from a plurality of data centers 350 can establish a plurality of tunnels 375 with the plurality of access points 330. The system can be configured such that each data center 350 can establish a tunnel 375 between that data center 350 and each of the access points 330.

At step 1102, a client application 305 can send a request that is intercepted by an agent 120. The request can be a request to connect to an application 360-1 which is provided by one or more of data centers 350. The request can include a DNS request. The request can include a request to establish a connection. The connection can be with an access point 330, a data center 350 or an application 360. The agent 120 can attempt to retrieve the IP address of a particular access point 330 (e.g., ZTNA POP) so as to be able to connect to the respective application 360. The agent 120 can determine that the requested application 360 is an internal application offered by multiple data centers 350.

In step 1103, the agent 120 can send a DNS request for the ZTNA top level domain (TLD), which can be provided by the ZTNA service provider (e.g., ztna.cloud.com). The DNS request can identify the application 360 to which the client 102 wants to connect. The ZTNA TLD can include metadata that includes the DNS name. For example, the ZTNA TLD can include one or more DNS extensions and/or the name/identifier of the application 360 in a custom extension. The agent 120 can resolve the application's ZTNA TLD using the DNS server 310 at the GSLB service 305 by using the prefix as an application identifier.

In step 1104, the GSLB service 305 can utilize the entries in the measurements DB 315 to identify the access point 330 and data center 350 pair that can produce a lowest latency connection for the client 102 to access the application 360 on the data center 350. GSLB service 305 can utilize front end latencies 320, back end latencies 325 and/or application state 365 to identify the combination of an access point 330 and data center 350 that produces a least delayed connection from the client 102 to the application 360. GSLB service 305 can implement this functionality in response to determining that the front and back end latencies 320 and 325 and application states 365 are available.

At step 1105, a DNS response is sent back to agent 120. The DNS response can include or identify the IP address of the access point 330 (e.g., the POP-1) out of the plurality of POPs, to which to connect. The DNS response can also include or identify the particular data center 350 (e.g., DC-3) of the plurality of data centers 350, to whose application 360 to connect.

At step 1106, agent 120 can send the request to the selected access point 330 (e.g., POP-1) to access the application 360 at the selected data center 350 (e.g., DC-350-3). The request can include the connection request in accordance with the ZTNA requirements. The request can include the credentials of the user at the client 102. Access point 330 can utilize the information from the request to determine if the user at the client 102 has the access to connect to the application 360.

At step 1107, access point 330 can send or forward the request to connect to the application 360-1 at the data center 350-3 over the tunnel 375. The request to connect to the application 360-1 can be sent to the connector 335.

At step 1108, the connector 335 can forward the request to the application 360-1 at the data center 350-3. The application 360-1 can then complete the connection with the client application 305, via the cloud tunnel 375 and via the access point 330 (e.g., POP-1).

In some implementations, once the connection and the network traffic for a specific user/client 102 and a specific application 360 has been steered to a specific ZTNA POP and its corresponding customer data center, the connection can persist, so as to avoid hopping across different data centers in the face of minor changes to the application latency. Therefore, once established, the connection can persist, unless an alternative, more efficient (e.g. lower latency) combination of another AP 330 and data center 350 is identified, where the alternative combination provides latency that is lower than the current latency by more than a predetermined threshold. The threshold can be a set/predefined threshold, such as 10, 15, 20, 30, 40, 50, 100 or more milliseconds. The threshold can also be in terms of a percentage offset/adjustment of the latency of the current connection, such as being lower by 1%, 5%, 10%, 15%, 20%, 25%, 30%, 40%, 50%, or more than 50% of the current latency value.

In some implementations, other geofencing considerations, due to legal, compliance or other reasons, may further influence the ZTNA and data center and access point selection process. For example, a GDPR compliance may require EU users to only be steered to EU ZTNA POPs and customer data centers, even if said decision is not optimal from an RTT perspective. For example, a compliance consideration may trigger exclusion of a particular one or more data centers 350 and one or more access points 330, due to their geographical location or other system specific features.

In some implementations, availability information with regards to the ZTNA POPs 330 and the data centers 350, that can augment RUMs and can provide for faster convergence to a healthy POP/datacenter combination in case of an outage.

In some aspects, the present solution relates to a method 1200 of establishing a connection for a client to an internal application via a combination of an access point and a data center providing a least latent communication. The present solution can include a series of acts, such as acts 1205-1225 of the method 1200 that can provide for establishing the least latent connection between the client and the target application based on front end and back end latencies of the system and the application status data. Act 1205 can include accessing front and back end latencies and application statuses. At act 1210, a state of an application is received. At act 1215, an access point and a data center are determined. At act 1220, the DNS response is sent. At act, 1225, a connection, via the access point, to the application at the data center, is made.

Act 1205 can include accessing front and back end latencies and application statuses. A service, such as a GSLB service, can access a first plurality of measurements of network latency between a plurality of access-points and the first client device and a second plurality of measurements of network latency between the plurality of access-points and one or more of data centers. The first plurality of measurements can include front end latency measurements. For example, the first plurality of measurements can include RUM and/or RTT measurements taken between the client device and one or more access points (e.g., POPs) of a ZTNA system. The first plurality of measurements can include network latencies between one or more of the plurality of access-points and one or more of client devices. The second plurality of measurements can include network latencies between one or more of the plurality of access-points and one or more of a plurality connector devices of the plurality of data centers. The second plurality of measurements can include back end latency measurements. For example, the second plurality of measurements can include RUM and/or RTT measurements taken between the data center and/or connector device of the data center and one or more access points (e.g. POPs) of the ZTNA system. GSLB service can receive the plurality of measurements from the agent of the first client and the second plurality of measurements from one or more data centers. GSLB service can store, in a database, the first plurality of measurements and the second plurality of measurements. A first measurement of the first plurality of measurements can include a round-trip time of a packet communicated between a first client device and a first access-point of the plurality of access-points. A second measurement of the second plurality of measurements can include a round-trip time of a packet communicated between one of the plurality of access-points and one of the one or more of data centers. The first plurality of measurements can be taken, acquired and/or established in accordance with the steps or techniques discussed in connection with the method 800, an example of which is shown in FIG. 8. The second plurality of measurements can be taken, acquired and/or established in accordance with the steps or techniques discussed in connection with method 900, an example of which is shown in FIG. 9.

At act 1210, a state of an application is received. GSLB service can receive, from one or more data centers of the plurality of data centers, a state of an application which can include information or data indicating the health of an application deployed across the one or more data centers. The application for which the state (e.g., health) information or data is received can be an internal application provided by one or more data centers. The state of the application can be acquired or received by the GSLB service in accordance with the method 1000, an example of which is shown in FIG. 10.

At act 1215, an access point and a data center are determined. GSLB service can determine the first data center of the one or more data centers and a first access-point of one or more access-points. GSLB service can determine the first data center from a plurality of data centers, and the first access point from a plurality of access points. GSLB service can determine the first data center and the first access point, based on, responsive to, according to or otherwise using the first plurality of measurements, the second plurality of measurements and/or the health (e.g., state) of the application. GSLB service can identify which data centers include an operational or functional application based on the state of application (e.g., health) and can exclude from the selection of the data centers those data centers that do not include an operational or functional application.

GSLB service can identify the pair that includes the first access point and the first data center from the selection of data centers that include the functional or operational application, thus excluding data centers with non-functional or non-operational internal applications. GSLB service can identify the pair (e.g. the first access point and the first data center) based on the lowest combined latency of all possible combinations (e.g., pairs) of an access point from the plurality of access points and data center from the one or more data centers. The combined latencies of all pairs can be determined based on, using and/or adding together the front end latency corresponding to the access point and the back end latency corresponding to the data center. The pair with the lowest combined latency can be determined by identifying the pair (e.g., the access point and the data center) whose combination of front and back latencies correspond to the lowest combined latency among all combined latencies. The combined latencies can be stored or organized in a table or a matrix, such as tables 1-4.

GSLB service can determine the first data center by eliminating or downgrading the at least one or more data centers where health of the application is degraded relative to health of the application deployed at the first data center. GSLB service can determine that the first access-point and the first data center corresponds to a least combined network latency among those corresponding to pairs of an access-point and a data center from the one or more data centers.

GSLB service can make the determination in response to a DNS request GSLB service can receive from the first client device. The DNS request can be for the internal application that can be provided by one or more data centers. GSLB service can receive the DNS request from the agent of the client that has intercepted the request from a client application on the client device to connect to a remote internal application on one or more data centers. GSLB service can determine the access point and the data center to choose for the connection between the client and the internal application in accordance with the method 1100, an example of which is shown in FIG. 11.

At act 1220, the DNS response is sent. GSLB service can send, to the first client device that sent a DNS request for the internal application, a DNS response identifying the first access-point and the first data center. The DNS response can be generated by the DNS server of the GSLB service. The DNS response can include one or more metadata and/or one or more DNS extensions to indicate the first data center and/or the first access point.

At act 1225, a connection to the application at the data center, via the access point, is made. The agent of the client can receive the DNS response from the GSLB service. The agent can determine from the DNS response the first access point out of a plurality of access points and the first data center out of one or more of data centers, or a plurality of data centers, to which to send a connection request. The agent can determine an identifier, such as a hostname or an IP address of the first access point and an identifier, such as a hostname or an IP address of the data center. The agent can send the request to the first access point to connect to the internal application at the first data center based on the DNS response. The client and the internal application at the first data center can communicate via the first access point and the tunnel established between the access point and the data center.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
   accessing, by a service, a first plurality of measurements of network latency between a plurality of access-points and a first client device and a second plurality of measurements of network latency between the plurality of access-points and one or more data centers;
   receiving, by the service from the one or more data centers, health of an application deployed across the one or more data centers;
   determining, by the service according to the first plurality of measurements, the second plurality of measurements and the health of the application, a first data center of the one or more data centers and a first access-point of the plurality of access-points; and
   sending, by the service to the first client device, a domain name system (DNS) response identifying the first access-point and the first data center.

2. The method of claim 1, comprising receiving, by the service, a DNS request from the first client device for the application.

3. The method of claim 1, comprising receiving, by the service, the first plurality of measurements from an agent of the first client device and the second plurality of measurements from the one or more data centers.

4. The method of claim 1, comprising storing, by the service in a database, the first plurality of measurements and the second plurality of measurements.

5. The method of claim 1, comprising determining, by the service, the first data center by eliminating or downgrading the at least one or more data centers where health of the application is degraded relative to health of the application deployed at the first data center.

6. The method of claim 1, wherein the second plurality of measurements comprises network latencies between the plurality of access-points and one or more connector devices of the one or more data centers.

7. The method of claim 1, comprising determining, by the service, that the first access-point and the first data center corresponds to a least combined network latency among those corresponding to pairs of an access-point from the plurality of access points and a data center from the one or more data centers.

8. The method of claim 1, wherein at least one of:
- a first measurement of the first plurality of measurements comprises a round-trip time of a packet communicated between the first client device and a first access-point of the plurality of access-points; and
- a second measurement of the second plurality of measurements comprises a round-trip time of a packet communicated between one of the plurality of access-points and the one or more data centers.

9. The method of claim 1, wherein the DNS response includes metadata or a DNS extension to indicate the first data center.

10. At least one network node comprising:
at least one hardware processor configured to:
- access a first plurality of measurements of network latency between a plurality of access-points and of a first client device and a second plurality of measurements of network latency between the plurality of access-points and one or more data centers;
- receive, from the one or more data centers, health of an application deployed across the one or more data centers;
- determine, according to the first plurality of measurements, the second plurality of measurements and the health of the application, a first data center of the one or more data centers and a first access-point of the plurality of access-points; and
- send, to the first client device, a domain name system (DNS) response identifying the first access-point and the first data center.

11. The at least one network node of claim 10, wherein the at least one processor is configured to receive a DNS request from the first client device for the application.

12. The at least one network node of claim 10, wherein the at least one processor is configured to receive the first plurality of measurements from an agent of the first client device, and the second plurality of measurements from the one or more of data centers.

13. The at least one network node of claim 10, wherein the at least one processor is configured to store, in a database, the first plurality of measurements and the second plurality of measurements.

14. The at least one network node of claim 10, wherein the at least one processor is configured to determine the first data center by eliminating or downgrading at least one of the one or more data centers where health of the application is degraded relative to health of the application deployed at the first data center.

15. The at least one network node of claim 10, wherein the second plurality of measurements comprises network latencies between the plurality of access-points and one or more connector devices of the one or more data centers.

16. The at least one network node of claim 10, wherein the at least one processor is configured to determine that the first access-point and the first data center corresponds to a least combined network latency among those corresponding to pairs of an access-point and a data center from the one or more data centers and the one or more data centers.

17. The at least one network node of claim 10, wherein at least one of a first measurement of the first plurality of measurements comprises a round-trip time of a packet communicated between the first client device and a first access-point of the plurality of access-points; and
- a second measurement of the second plurality of measurements comprises a round-trip time of a packet communicated between one of the plurality of access-points and one the one or more data centers.

18. The at least one network node of claim 10, wherein the DNS response includes metadata or a DNS extension to indicate the first data center.

19. A non-transitory computer-readable medium storing instructions that, when executed by at least one processor of a service, cause the at least one processor to:
- access a first plurality of measurements of network latency between a plurality of access-points and of a first client device and a second plurality of measurements of network latency between the plurality of access-points and one or more data centers;
- receive, from the one or more data centers, health of an application deployed across the one or more data centers;
- determine, according to the first plurality of measurements, the second plurality of measurements and the health of the application, a first data center of the one or more data centers and a first access-point of the plurality of access-points; and
- send, to the first client device, a domain name system (DNS) response identifying the first access-point and the first data center.

20. The non-transitory computer-readable medium of claim 19, wherein the instructions, when executed by the at least one processor of a service, cause the at least one processor to determine the first data center by eliminating or downgrading at least one of the one or more data centers where health of the application is degraded relative to health of the application deployed at the first data center.

* * * * *